United States Patent
Jung et al.

(10) Patent No.: US 12,473,349 B2
(45) Date of Patent: Nov. 18, 2025

(54) PD-1 VARIANTS HAVING INCREASED PD-L1 AFFINITY

(71) Applicant: KOREA UNIVERSITY RESEARCH AND BUSINESS FOUNDATION, Seoul (KR)

(72) Inventors: Sang-Taek Jung, Seoul (KR); Ji-Yeon Ha, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 575 days.

(21) Appl. No.: 17/923,472

(22) PCT Filed: May 6, 2021

(86) PCT No.: PCT/KR2021/005657
§ 371 (c)(1),
(2) Date: Nov. 8, 2022

(87) PCT Pub. No.: WO2021/225378
PCT Pub. Date: Nov. 11, 2021

(65) Prior Publication Data
US 2023/0183318 A1 Jun. 15, 2023

(30) Foreign Application Priority Data

| May 6, 2020 | (KR) | 10-2020-0053981 |
| Aug. 6, 2020 | (KR) | 10-2020-0098405 |
| Oct. 8, 2020 | (KR) | 10-2020-0129925 |

(51) Int. Cl.
| C07K 14/705 | (2006.01) |
| C12N 15/63 | (2006.01) |
| G01N 33/574 | (2006.01) |
| G01N 33/68 | (2006.01) |

(52) U.S. Cl.
CPC ........ *C07K 14/70596* (2013.01); *C12N 15/63* (2013.01); *G01N 33/574* (2013.01); *G01N 33/68* (2013.01)

(58) Field of Classification Search
None
See application file for complete search history.

(56) References Cited

U.S. PATENT DOCUMENTS

| 8,735,553 B1 | 5/2014 | Li et al. |
| 2016/0039903 A1 | 2/2016 | Ring et al. |
| 2016/0052990 A1 | 2/2016 | Ring et al. |

FOREIGN PATENT DOCUMENTS

| KR | 10-2019-0094105 A | 8/2019 |
| KR | 10-2021-0135838 A | 11/2021 |
| WO | 2017/200796 A1 | 11/2017 |
| WO | 2017/201131 A1 | 11/2017 |
| WO | 2019/151771 A1 | 8/2019 |
| WO | 2019/241758 A1 | 12/2019 |

OTHER PUBLICATIONS

Roy L. Maute et al., "Engineering high-affinity PD-1 variants for optimized immunotherapy and immuno-PET imaging", PNAS, (electronic publication) Nov. 10, 2015, pp. E6506-E6514, 112, vol. 47.
Eszter Lázár-Molnár et al., "Structure-guided development of a high-affinity human Programmed Cell Death-1: Implications for tumor immunotherapy", EBioMedicine, (electronic publication), Feb. 6, 2017, pp. 30-44, vol. 17.
International Search Report for PCT/KR2021/005657, dated Aug. 13, 2021.

*Primary Examiner* — Changhwa J Cheu
(74) *Attorney, Agent, or Firm* — Sughrue Mion, PLLC

(57) ABSTRACT

The present disclosure relates to PD-1 variants having minimal mutations for enhancing binding ability to PD-L1. The PD-1 variants of the present disclosure have fewer mutations than existing PD-1 and PD-1 variants and have significantly increased binding ability to PD-L1 compared to the existing variants, thereby solving the problem of immunogenicity. In addition, since these variants are very small-sized proteins as compared to existing antibody therapeutic agents, PD-1/PD-L1 binding of tumors and immune cells in a tumor micro-environment can be effectively inhibited, and since the problem of low binding ability of PD-L1 to existing PD-1 has been solved, the therapeutic effect thereof as a therapeutic agent can be significantly improved. These variants can also be used as an imaging agent for detecting the expression level of PD-L1.

23 Claims, 7 Drawing Sheets

Figures 4, 5:
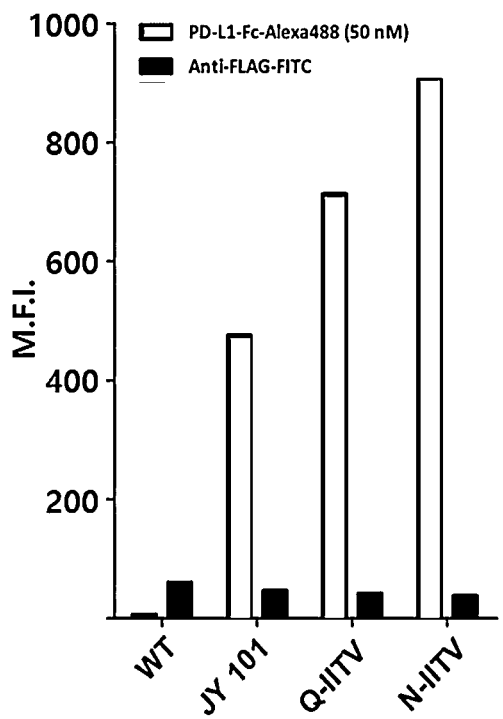

Specification includes a Sequence Listing.

Fig.1
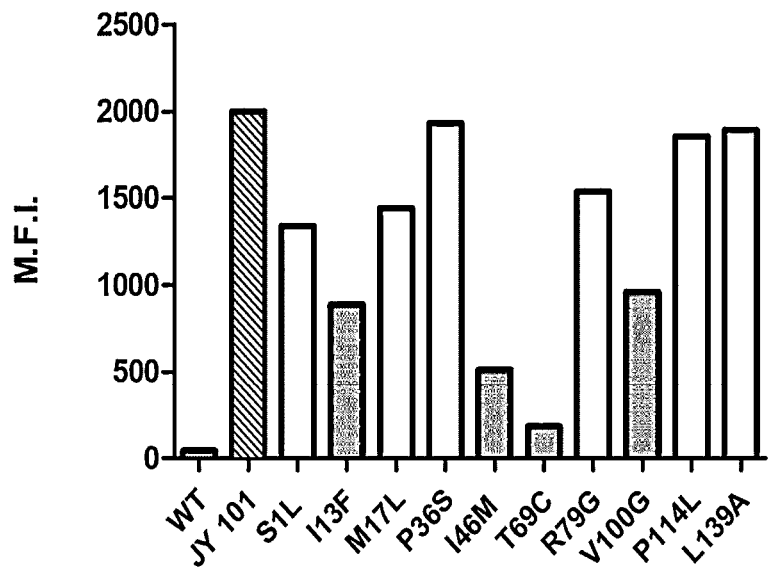
Fig.2
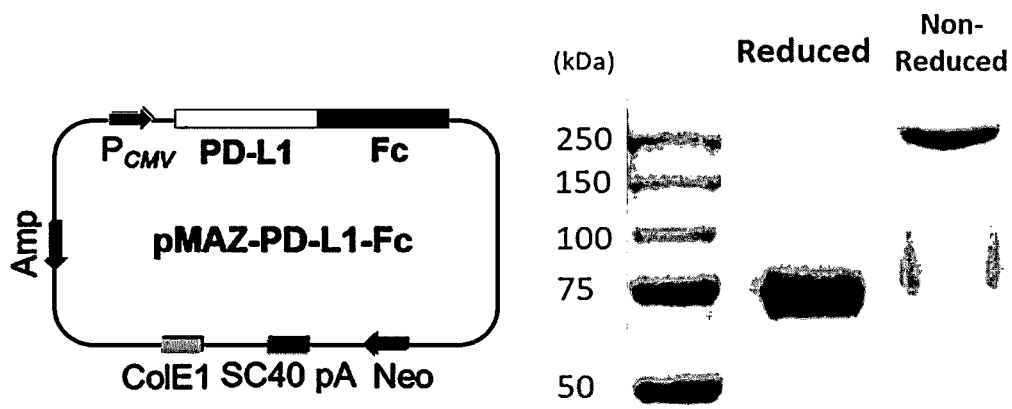
Fig.3

```
LDSPDRPWNPPTFSPALLVVTEGDNATFTCSFSNTSESFVLNWYRMSPSNCTDKLAAFPEDRSCPGDCRF
.............................C........C............C................
................I............C........C........I...C................T..
................I............C.....YC........R..I...C...E............T..
................I............C........C........I...C................T..
................I............C........C........I...C................T..
S.......D...I............C........C........I...C................T..
..............I............C........C........I...C................T..
..F...........I............C........C........I...C................T..
.Y............I............C.....G..C........I..NC.....T.........L.T..

RVTCLPNGRDFHMSVVRARRNDSGTYLCGAISLAPKACIKESLRAELRVTERRAEVPTAHPSPSPRPAGCFC
.............C.........................................................
.............C......V..................................................
.............C......V..................................................
........H....C......V..................................................
.............C..D....V..................................................
.............C......V..................................................
.............C......V..................................................
....L........C......V..................................................
....P........C......V............................................A.....
```

|  | $K_D$(M) | Ka (1/Ms) | kd(1/s) | Rank |
|---|---|---|---|---|
| WT | Not detect | Not detect | Not detect | 7 |
| CKJ 49 | 5.054e-7 | 7.408e4 | 3.744e-2 | 6 |
| JY 101 | 1.892e-7 | 1.792e5 | 3.391e-2 | 5 |
| Q10 | 5.007e-8 | 1.133e5 | 5.671e-3 | 4 |
| Q12 | 5.49e-9 | 1.481e5 | 8.131e-4 | 1 |
| Q18 | 4.688e-8 | 1.481e5 | 6.944e-3 | 3 |
| Q33 | 3.511e-8 | 1.113e5 | 3.908e-3 | 2 |

|  | $K_D$(M) | Ka (1/Ms) | kd(1/s) |
|---|---|---|---|
| HAC | 5.522e-9 | 2.774e5 | 1.532e-3 |
| Q12 | 5.490e-9 | 1.481e5 | 8.131e-4 |

Fig.13
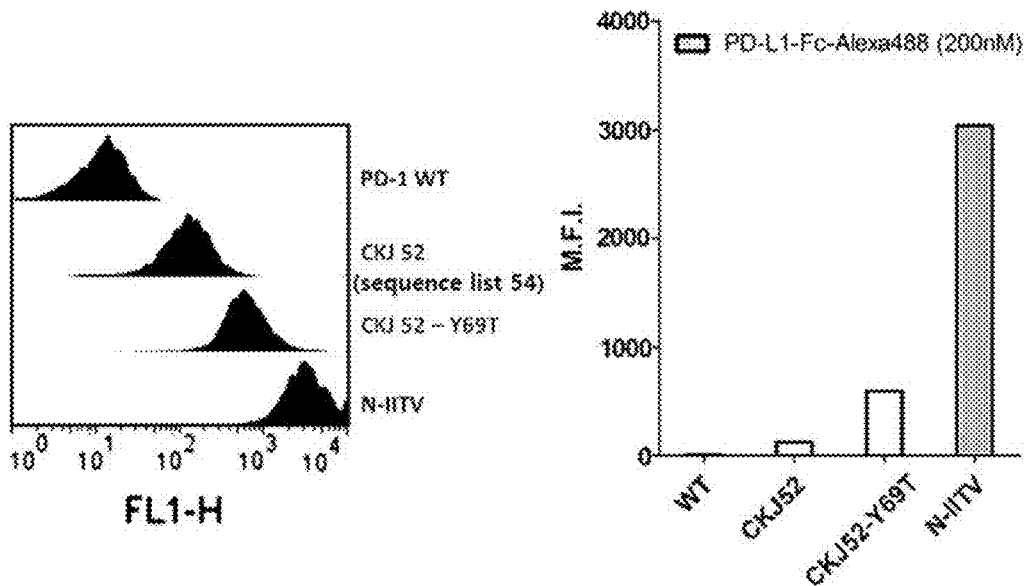
Fig.14
```
         10        20        30        40        50        60        70        80        90       100       110       120       130       140
LDSPDRPLDPFTISPALLVVTEGDCAFFTCSFSCTSKSFVLNWYRISPSCCTDRLAAFPEDRSCPGCDTRFRVTCLPNGRDFHMSVVRARRCDSGTYLCVAISLAPKVQIKESLRAELRVTERRAEVPTAHPSPRPACCFGI
..........................N...............................................................................................................
.........................N.................................................................................................................
....................................................N......................................................................................
...........................................................................................................................N.............
```
Fig.15
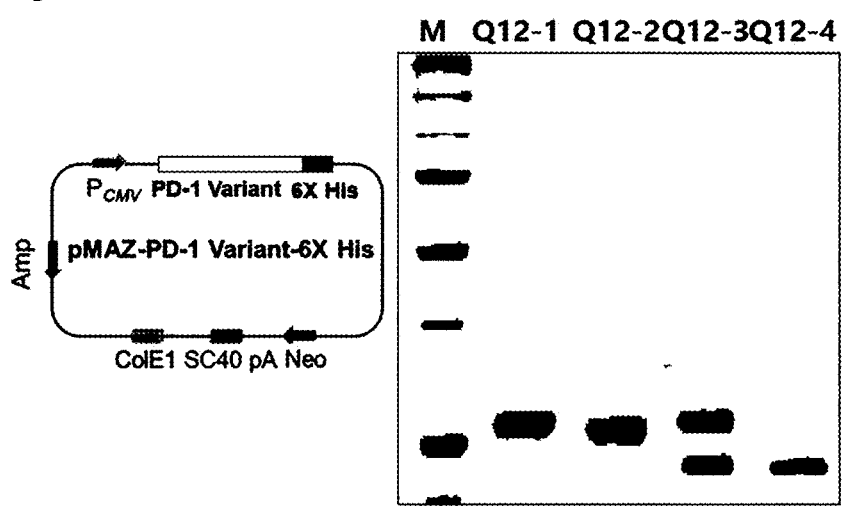

| | $K_D$(M) | Rank |
|---|---|---|
| WT | ≥ 1e-6 * | 7 |
| HAC | 1.304 X 10⁻⁸ | 5 |
| JY-Q12 | 1.098 X 10⁻⁸ | 4 |
| JY-Q12-1 | 7.375 X 10⁻⁹ | 3 |
| JY-Q12-2 | 8.992 X 10⁻¹⁰ | 1 |
| JY-Q12-3 | 3.241 X 10⁻⁹ | 2 |
| JY-Q12-4 | 1.731 X 10⁻⁸ | 6 |

* $K_D$ = 8.20 ± 0.10 μM for PD-1 WT/PD-L1 (Cheng et al., 2013)
** N.D. : Not Determined

PD-1 VARIANTS HAVING INCREASED PD-L1 AFFINITY

CROSS REFERENCE TO RELATED APPLICATIONS

This application is a National Stage of International Application No. PCT/KR2021/005657 filed May 6, 2021, claiming priority based on Korean Patent Application No. 10-2020-0053981 filed May 6, 2020, Korean patent Application No. 10-2020-0098405 filed Aug. 6, 2020 and Korean Patent Application No. 10-2020-0129925 filed Oct. 8, 2020, the entire disclosures of which are incorporated herein by reference.

TECHNICAL FIELD

The present disclosure relates to PD-1 variants having improved affinity to PD-L1.

BACKGROUND ART

Medicines for cancer treatment are largely divided into small molecule medicines and large molecule medicines, and high molecular weight medicines with specificity are in the spotlight as therapeutic agents compared to low molecular weight medicines with relatively large side effects without specificity. Cancer cells express, on a cell surface, an immune checkpoint protein, which is used when normal cells suppress immune cell activation in order to evade the killing mechanism by immune cells, and recently, research on an immune checkpoint inhibitory protein has been actively conducted as a method for treating cancer.

Blocking of PD-1/PD-L1 binding among immune checkpoint inhibitory proteins has a great effect in cancer treatment, and it has been reported in academia that it has fewer side effects compared to other immune checkpoint inhibitory proteins (J. Naidoo et al. (2015) Annals of Oncology, Lucia Gelao et al. (2014) Toxins, Gorge K. Philips et al (2015) International Immunology). A PD-1 receptor is expressed on the surface of activated immune cell types including T cells, B cells, natural killer (NK)/natural killer T (NKT) cells, etc. (Goodman, Patel & Kurzrock, PD-1-PD-L1 immune-checkpoint blockade in B-cell lymphomas, Nature Reviews Clinical Oncology, 14:203-220, 2017). PD-1 is a negative regulator of T cell activity, and the interaction between PD-1 and PD-L1, one of its ligands, on a tumor surface exhibits immune checkpoint blockage that reduces the ability of activated T cells to generate an effective immune response. High-level expression of PD-L1 on the tumor cell surface inhibits T cell functions including cytotoxic activity to be able to deviate from an anti-tumor response. PD-L1 is overexpressed in many cancers and is often associated with an unfavorable prognosis (Okazaki T et al., Intern. Immun. 2007 19(7):813; Thompson R H et al., Cancer Res 2006, 66(7):3381). Interestingly, in contrast to T lymphocytes in normal tissues and peripheral blood T lymphocytes, most of tumor-infiltrating T lymphocytes predominantly express PD-1, which suggests that up-regulation of PD-1 on tumor-reactive T cells may contribute to an impaired anti-tumor immune response (Blood 2009 114(8): 1537). This may be caused by the utilization of PD-L1 signaling mediated by PD-L1 expression tumor cells that interact with PD-1 expression T cells, resulting in attenuation of T cell activation and evasion of immune surveillance (Sharpe et al., Nat Rev 2002, Keir M E et al., 2008 Annu. Rev. Immunol. 26:677). Accordingly, the inhibition of the PD-L1/PD-1 interaction may enhance CD8+ T cell mediated death of tumors. The inhibition of PD-L1 signaling has been proposed as a means of enhancing treatment of cancer (e.g., tumor immunity) and T cell immunity to infection, including both acute infection and chronic (e.g., persistent) infection. Optimal therapeutic treatment may be combined with substances that directly inhibit tumor growth, blocking the PD-1 receptor/ligand interaction. There remains a need for optimal therapies for treating, stabilizing, preventing and/or delaying the onset of various cancers.

Therapeutic antibodies targeting PD-1 or PD-L1 block ligand-receptor interaction and restore immune functions to a tumor micro-environment. The use of these mAbs has shown interesting clinical responses for many cancer types, and an increasing number of mAbs have entered clinical development. Several therapeutic monoclonal antibodies (mAbs) targeting PD-1 and PD-L1 are commercially available, and 12 kinds or more of traditional and bispecific mAbs have been reviewed in FDA and EMA. Opdivo (nivolumab) from BMS Co., Ltd., Keytruda (Pembrolizumab) from Merck Co., Ltd., and Libtayo (Cemiplimab) developed from Regeneron Co., Ltd., as anti-PD1 antibody therapeutic agents that inhibit PD-1 and PD-L1 binding ability, and Tecentriq (Atezolizumab) from Roche Co., Ltd., Imfinzi (Durvalumab) from AstraZeneca Co., Ltd., and Bavencio (Avelumab) from Merck Sereno Co., Ltd., as anti-PD-L1 antibody therapeutic agents have been recently approved by the US FDA to bring about an innovation in the treatment of intractable cancer in clinical practice. The clinical demand for these PD-1/PD-L1 interaction inhibitory antibody therapeutic agents has exploded, and in the case of Opdivo, sales in 2018 are USD 7.5 billion and in the case of Keytruda, sales in 2018 are USD 7.1 billion, which are ranked 4th and 6th in the top prescription drugs based on sales, and the clinical demand for these immune checkpoint inhibitory therapeutic antibodies is expected to be further expanded in the future.

However, since the antibody is a macromolecular protein having a molecular weight of 150,000, it is difficult to penetrate into cancer tissue, and thus, there is a disadvantage that it is difficult to inhibit the PD-1/PD-L1 binding of tumor cells and immune cells in a tumor micro-environment. For more effective treatment, there is a need for a protein therapeutic agent that is much smaller than an antibody and easily penetrates into the cancer tissue.

However, the PD-1 protein exposed as an ectodomain of human T cells has a small size and has a property of binding to PD-L1 molecule expressed in the tumor. Accordingly, for cancer treatment through effective immune checkpoint inhibition, PD-1, which is smaller in size than PD-L1 to be excellent in cell penetration, is more suitable, but there has been a drawback that wild-type PD-1 binds to PD-L1 with very low affinity (equilibrium dissociation constant=to 8.7 μM).

DISCLOSURE

Technical Problem

An object of the present disclosure is to provide a PD-1 variant having increased binding ability to PD-L1.

Another object of the present disclosure is to provide a binding inhibitor of PD-L1 and PD-1.

Yet another object of the present disclosure is to provide a composition for detecting PD-L1.

Still another object of the present disclosure is to provide a pharmaceutical composition for treating or preventing cancer.

Still another object of the present disclosure is to provide a composition for diagnosing cancer.

Still yet another object of the present disclosure is to provide a specific detection method of PD-L1.

Still yet another object of the present disclosure is to provide a method for producing a PD-1 variant having increased binding ability to PD-L1.

Technical Solution

An aspect of the present disclosure provides a PD-1 variant having increased binding ability to PD-L1.

Another aspect of the present disclosure provides a binding inhibitor of PD-L1 and PD-1 including the PD-1 variant.

Yet another aspect of the present disclosure provides a composition for detecting PD-L1 including the PD-1 variant.

Still another aspect of the present disclosure provides a pharmaceutical composition for treating or preventing cancer including the PD-1 variant.

Still another aspect of the present disclosure provides a composition for diagnosing cancer including the PD-1 variant.

Still yet another aspect of the present disclosure provides a specific detection method of PD-L1.

Still yet another aspect of the present disclosure provides a method for producing a PD-1 variant having increased binding ability to PD-L1.

Advantageous Effects

According to the present disclosure, the PD-1 variant has fewer mutations than existing PD-1 and PD-1 variants and has significantly increased binding ability to PD-L1 compared to the existing PD-1 and PD-1 variants, thereby solving an immunogenicity problem. In addition, since these variants are proteins of a very small size compared to existing antibody therapeutic agents, these variants can effectively inhibit PD-1/PD-L1 binding of tumor and immune cells in a tumor micro-environment and solve a problem of low binding ability to PD-L1 of existing PD-1. Therefore, it is possible to significantly improve a therapeutic effect as a therapeutic agent and to be used as an imaging agent for detecting an expression level of PD-L1.

DESCRIPTION OF DRAWINGS

FIG. 1 is a diagram of confirming mutational sites important for binding ability to PD-L1 in a PD-1 variant JY 101 through FACS.

FIG. 2 is a diagram of comparing amino acid sequences of an N-IITV variant and an aglycosylated variant Q-IITV thereof having binding ability-increased mutations with a wild type.

FIG. 3 is a diagram illustrating SDS-PAGE gel photographs of a pMaz vector containing dimeric human PD-L1 (PD-L1-Fc) and a purified dimeric PD-L1 protein for searching for binding ability to PD-L1 of PD-1 variants.

FIG. 4 is a diagram of confirming dimeric human PD-L1 (PD-L1-Fc) as results of PD-L1 binding ability analysis of *E. coli* cells displaying wild-type PD-1, and a JY101 variant, an N-IITV variant, and a Q-IITV variant in previous studies, respectively.

FIG. 5 is a diagram illustrating amino acid sequencing data of a constructed error prone library.

FIG. 6 is a diagram illustrating results of a library enrichment test through a flow cytometer.

FIG. 7 is a diagram illustrating results of analysis of PD-L1 binding ability of *E. coli* cells displaying aglycosylated PD-1 variants.

FIG. 8 is a diagram illustrating SDS-PAGE gel photographs and yields of expression vectors of aglycosylated PD-1 variants and purified aglycosylated PD-1 variant proteins.

FIG. 9 is a diagram illustrating sensorgrams for each concentration of respective variants.

FIG. 10 is a diagram illustrating $K_D$ values of respective variants.

FIG. 11 is a diagram illustrating sensorgrams for each concentration of a glycosylated variant HAC and an aglycosylated variant Q12 (JY_Q12).

FIG. 12 is a diagram illustrating $K_D$ values of a glycosylated variant HAC and an aglycosylated variant Q12 (JY_Q12).

FIG. 13 is a diagram of comparing results of analysis of binding ability to PD-L1 of wild-type PD-1, CKJ 52 of the prior patent, CKJ 52-Y69T prepared in Example 5, and an N_IITV variant of the present disclosure.

FIG. 14 is a diagram illustrating amino acid sequences of PD-1 JY-Q12 glycosylated variants:

Top sequence: PD-1 JY-Q12 variant;

Second sequence: amino acid substitution and glycosylation site of JY_Q12-1 (Q25N);

Third sequence: amino acid substitution and glycosylation site of JY_Q12-2 (Q34N);

Fourth sequence: amino acid substitution and glycosylation site of JY_Q12-3 (Q50N); and Fifth sequence: amino acid substitution and glycosylation site of JY_Q12-4 (Q92N).

FIG. 15 is a diagram showing SDS-PAGE gel photographs of an expression vector of PD-1 JY-Q12 glycosylated variants and purified PD-1 JY-Q12 glycosylated variant proteins.

FIG. 16 is a diagram illustrating sensorgrams for each concentration of respective variants measured using BLItz.

FIG. 17 is a diagram illustrating $K_D$ values of respective variants measured using BLItz.

BEST MODES OF THE INVENTION

Hereinafter, an exemplary embodiment of the present disclosure will be described in detail with reference to the accompanying drawings. However, the following embodiments are presented as examples for the present disclosure, and when it is determined that a detailed description of well-known technologies or configurations known to those skilled in the art may unnecessarily obscure the gist of the present disclosure, the detailed description thereof may be omitted, and the present disclosure is not limited thereto. Various modifications and applications of the present disclosure are possible within the description of claims to be described below and the equivalent scope interpreted therefrom.

Terminologies used herein are terminologies used to properly express embodiments of the present disclosure, which may vary according to a user, an operator's intention, or customs in the art to which the present disclosure pertains. Accordingly, definitions of the terminologies need to be described based on contents throughout this specification. Throughout the specification, when a certain part "comprises" a certain component, unless explicitly described to the contrary, it is meant that the part does not exclude other components, but may further comprise other components.

All technical terms used in the present disclosure, unless otherwise defined, have the meaning as commonly understood by those skilled in the related art of the present disclosure. In addition, although preferred methods and samples are described herein, similar or equivalent methods and samples thereto are also included in the scope of the present disclosure. The contents of all publications disclosed as references in this specification are incorporated in the present disclosure.

Throughout the present specification, general one-letter or three-letter codes for naturally existing amino acids are used, and generally allowed three-letter codes for other amino acids, such as α-aminoisobutyric acid (Aib) and N-methylglycine (Sar) are also used. The amino acids mentioned herein as abbreviations are also described as follows according to the IUPAC-IUB nomenclature.

Alanine: A, Arginine: R, Asparagine: N, Aspartic Acid: D, Cysteine: C, Glutamic Acid: E, Glutamine: Q, Glycine: G, Histidine: H, Isoleucine: I, Leucine: L, Lysine: K, Methionine: M, Phenylalanine: F, Proline: P, Serine: S, Threonine: T, Tryptophan: W, Tyrosine: Y and Valine: V.

In one aspect, the present disclosure relates to a programmed cell death protein-1 (PD-1) variant having increased binding ability to programmed death-ligand 1 (PD-L1), including amino acid substitution of F13I, M46I, C69T and G100V in amino acid of wild-type PD-1.

In one embodiment, the amino acid of wild-type PD-1 may include an amino acid sequence of SEQ ID NO: 1, and the amino acid substitution site may be based on the amino acid sequence of SEQ ID NO: 1.

In one embodiment, the PD-1 variant of the present disclosure may include amino acid substitutions of F13I, M46I, C69T and G100V, and may be an N-IITV variant of SEQ ID NO: 2 having significantly increased binding ability to PD-L1.

In one embodiment, the PD-1 variant of the present disclosure may further include any one or more of amino acid substitutions of N25Q, N34Q, N50Q and N92Q, thereby having aglycosylation characteristics.

In one embodiment, the PD-1 variant of the present disclosure having an aglycosylation characteristic may include any one selected from the group consisting of amino acid sequences of SEQ ID NOs: 3 to 7.

Since there is an N-linked glycosylation site present in an ectodomain of PD-1, there has been a drawback of glycan heterogenity, which is a difference in glycosylation patterns depending on a cell line, a culture process, and a purification process. However, the PD-1 variant having the aglycosylation characteristic of the present disclosure has significantly improved binding ability to PD-L1 by the amino acid substitution compared to existing variants and has an aglycosylation characteristic by a specific amino acid substitution. Accordingly, there is a large advantage in biopharmaceutical manufacturing in that it is easy to mass-produce the PD-1 variant at low cost even in bacteria, and there is no drawback of glycan heterogenity according to a cell line, a culture process, and a purification process. In addition, although N-glycosylation is very important for the binding ability to PD-L1 of the PD-1 protein and the protein stability, the PD-1 variant is a glycosylated variant with improved binding ability and stability.

In one embodiment, the PD-1 variant of the present disclosure may further include amino acid substitutions of W8L, N9D, E37K, A108V and G140C, and may be a glycosylated variant in which a sugar chain is attached to an N-linked glycosylation site present in an ectodomain of PD-1 and any one or more glycosylated variants of N25, N34, N50 and N92, so that binding ability to PD-L1 may be increased due to glycosylation at the site.

In one embodiment, the glycosylated PD-1 variant of the present disclosure may include any one selected from the group consisting of amino acid sequences of SEQ ID NOs: 8 to 11.

The glycosylated PD-1 variant refers to substitution of some amino acid sequences in the PD-1 protein (or peptide), and as used herein, the term "variant" includes an amino acid sequence corresponding to at least one amino acid difference (substitution, insertion, or deletion) compared to a reference substance. In specific embodiments, the "variant" has high amino acid sequence homology and/or conservative amino acid substitution, deletion and/or insertion compared to a reference sequence. In addition, as used herein, the term "PD-1 variant" refers to a PD-1 variant protein mutated in one or more amino acids in order to regulate its binding activity to PD-L1 thereof.

Specifically, the PD-1 variant of the present disclosure may be prepared by a standard synthetic method, a recombinant expression system, or any other methods in the art. Accordingly, peptides according to the present disclosure may be synthesized by many methods including, for example, the following methods:

(a) a method of synthesizing a peptide by stages or by fragment assembly by means of a solid phase or liquid phase method and isolating and purifying a final peptide product;

(b) a method of expressing a nucleic acid construct encoding the peptide in a host cell, and recovering an expression product from a host cell culture;

(c) a method of performing the expression of the nucleic acid construct encoding the peptide within a cell-free tube, and recovering an expression product; or a method of obtaining fragments of the peptide in any combination of (a), (b) and (c), and then linking the fragments to obtain a peptide, and recovering the corresponding peptide.

As a more specific example, through genetic modification, a gene encoding the PD-1 variant of the present disclosure may be prepared, transformed into a host cell, and expressed to produce the PD-1 variant of the present disclosure.

In one aspect, the present disclosure relates to a nucleic acid molecule encoding the PD-1 variant of the present disclosure, a vector comprising the same, and a host cell comprising the vector.

As used herein, the term "nucleic acid molecule" refers to deoxyribonucleotide or ribonucleotide that exists in a single-stranded or double-stranded form, and includes natural nucleic acid analogs unless otherwise specified (Scheit, Nucleotide Analogs, John Wiley, New York (1980); Uhlman and Peyman, Chemical Reviews, 90:543-584 (1990)).

As used herein, the term "vector" refers to any nucleic acid including a competent nucleotide sequence that is inserted into a host cell to be recombined with a host cell genome and inserted to the host cell genome or replicates spontaneously as an episome. Such a vector includes a linear nucleic acid, a plasmid, a phagemid, a cosmid, an RNA vector, a viral vector, and the like.

As used herein, the term "host cell" refers to a eukaryotic or prokaryotic cell into which one or more DNAs or vectors are introduced, and should be understood to refer to not only a specific target cell but also its progeny or potential progeny. Since a certain modification may occur in subsequent generations due to mutations or environmental influences, in fact, the progeny is not identical to a parent cell, but is still included within the scope of the term as used herein.

In one aspect, the present disclosure relates to a binding inhibitor of PD-L1 and PD-1 comprising the PD-1 variant of the present disclosure, the nucleic acid molecule thereof, or the vector including the same.

In one aspect, the present disclosure relates to a composition for detecting PD-L1 comprising the PD-1 variant of the present disclosure.

In one embodiment, the composition may detect and quantify a protein expression level of PD-L1.

In one embodiment, the PD-1 variant may be labeled with one selected from the group consisting of a chromogenic enzyme, a radioactive isotope, a chromopore, a luminescent material and a fluorescent material, and the fluorescent material may be a cyanine (Cy)-based, Rhodamine-based, Alexa-based, BODIPY-based, or ROX-based fluorescent material, and may be Nile Red, BODIPY (4,4-difluoro-4-bora-3a,4a-diaza-s-indacene), cyanine, fluorescein, rhodamine, coumarin or Alexa.

Since the PD-1 variant of the present disclosure may detect and quantify the expression level of PD-L1, the PD-1 variant may be used before administration of existing immune checkpoint inhibitory antibody therapeutic agents administered after confirming the presence or absence of PD-L1 overexpression in cancer patients.

In one aspect, the present disclosure relates to a composition for bioimaging comprising the PD-1 variant of the present disclosure.

In one aspect, the present disclosure relates to a pharmaceutical composition for treating or preventing cancer comprising the PD-1 variant of the present disclosure, the nucleic acid molecule thereof, or the vector including the same.

In one embodiment, the cancer may be any one or more selected from the group consisting of brain tumor, melanoma, myeloma, non-small cell lung cancer, oral cancer, liver cancer, stomach cancer, colon cancer, breast cancer, lung cancer, bone cancer, pancreatic cancer, skin cancer, head or neck cancer, cervical cancer, ovarian cancer, colorectal cancer, small intestine cancer, rectal cancer, fallopian tube carcinoma, perianal cancer, endometrial carcinoma, vaginal carcinoma, vulvar carcinoma, Hodgkin's disease, esophageal cancer, lymph adenocarcinoma, bladder cancer, gallbladder cancer, endocrine adenocarcinoma, thyroid cancer, parathyroid cancer, adrenal cancer, soft tissue sarcoma, urethral cancer, penile cancer, prostate cancer, chronic or acute leukemia, lymphocytic lymphoma, kidney or ureter cancer, renal cell carcinoma, renal pelvic carcinoma, central nervous system tumor, primary central nervous system lymphoma, spinal cord tumor, brainstem gliomas and pituitary adenomas.

The pharmaceutical composition of the present disclosure may be used as a single therapy, but may also be used in combination with other conventional biological therapy, chemotherapy or radiation therapy, and may treat cancer more effectively in the case of such concurrent therapy. In the case of using the present disclosure for preventing or treating cancer, a chemotherapeutic agent that may be used with the composition includes cisplatin, carboplatin, procarbazine, mechlorethamine, cyclophosphamide, ifosfamide, melphalan, chlorambucil, bisulfan, nitrosourea, dactinomycin, daunorubicin, doxorubicin, bleomycin, plicomycin, mitomycin, etoposide, tamoxifen, taxol, transplatinum, 5-fluorouracil, vincristin, vinblastin, methotrexate, and the like. Radiation therapy that may be used together with the composition of the present disclosure includes X-ray irradiation and γ-ray irradiation.

In the present disclosure, the term "prevention" refers to any action that inhibits or delays the occurrence, spread, and recurrence of cancer by administration of the PD-1 variant according to the present disclosure or the composition including the same.

The therapeutically effective dose of the composition of the present disclosure may vary depending on several factors, for example, an administration method, a target site, a condition of a patient, and the like. Therefore, when used in the human body, the dose should be determined as an appropriate amount in consideration of both safety and efficiency. It is also possible to estimate the amount used in humans from the effective dose determined through animal experiments. These matters to be considered when determining the effective dose are described in, for example, Hardman and Limbird, eds., Goodman and Gilman's The Pharmacological Basis of Therapeutics, 10th ed. (2001), Pergamon Press; and E. W. Martin ed., Remington's Pharmaceutical Sciences, 18th ed. (1990), Mack Publishing Co.

The pharmaceutical composition of the present disclosure is administered in a pharmaceutically effective dose. As used herein, the "pharmaceutically effective dose" refers to an amount enough to treat diseases at a reasonable benefit/risk ratio applicable to medical treatment and enough to not cause side effects. An effective dose level may be determined according to a health condition of a patient, a disease type, severity, drug activity, sensitivity to drug, an administration method, an administration time, an administration route and excretion rate, a treatment period, factors including drugs used in combination or concurrently, and other factors well-known in medical fields. The composition according to the present disclosure may be administered as an individual therapeutic agent or in combination with other therapeutic agents, and may be administered sequentially or simultaneously with existing therapeutic agents, and may be administered singly or multiply. It is important to administer an amount capable of obtaining a maximum effect with a minimal amount without side-effects by considering all the factors, which may be easily determined by those skilled in the art.

The pharmaceutical composition of the present disclosure may include a carrier, diluent, excipient, or a combination of two or more thereof, which are commonly used in biological agents. As used herein, the term "pharmaceutically acceptable" refers to exhibiting non-toxic properties to normal cells or humans exposed to the composition. The carrier is not particularly limited as long as the carrier is suitable for in vivo delivery of the composition, and may be used by combining, for example, compounds described in Merck Index, 13th ed., Merck & Co. Inc., saline, sterile water, a Ringer's solution, buffered saline, a dextrose solution, a maltodextrin solution, glycerol, ethanol, and one or more of these components, and if necessary, other conventional additives such as an antioxidant, a buffer, and a bacteriostat may be added. In addition, the composition may be prepared in injectable formulations such as an aqueous solution, a suspension, and an emulsion, pills, capsules, granules, or tablets by further adding a diluent, a dispersant, a surfactant, a binder, and a lubricant. Furthermore, the composition may be prepared preferably according to each disease or ingredient using as a suitable method in the art or a method disclosed in Remington's Pharmaceutical Science (Mack Publishing Company, Easton PA, 18th, 1990).

In one embodiment, the pharmaceutical composition may be one or more formulations selected from the group including oral formulations, external formulations, suppositories, sterile injection solutions and sprays.

The composition of the present disclosure may include a carrier, diluent, excipient, or a combination of two or more thereof, which are commonly used in biological agents. The pharmaceutically acceptable carrier is not particularly limited as long as the carrier is suitable for in vivo delivery of the composition, and may be used by combining, for example, compounds described in Merck Index, 13th ed., Merck & Co. Inc., saline, sterile water, a Ringer's solution, buffered saline, a dextrose solution, a maltodextrin solution, glycerol, ethanol, and one or more of these ingredients, and if necessary, other conventional additives such as an antioxidant, a buffer, and a bacteriostat may be added. In addition, the composition may be prepared in injectable formulations such as an aqueous solution, a suspension, and an emulsion, pills, capsules, granules, or tablets by further adding a diluent, a dispersant, a surfactant, a binder, and a lubricant. Furthermore, the composition may be prepared preferably according to each disease or ingredient using as a suitable method in the art or a method disclosed in Remington's Pharmaceutical Science (Mack Publishing Company, Easton PA, 18th, 1990).

The composition of the present disclosure may further contain one or more active ingredients exhibiting the same or similar function. The composition of the present disclosure includes 0.0001 to 10 wt %, preferably 0.001 to 1 wt % of the protein, based on the total weight of the composition.

The pharmaceutical composition of the present disclosure may further include a pharmaceutically acceptable additive. At this time, the pharmaceutically acceptable additive may use starch, gelatinized starch, microcrystalline cellulose, lactose, povidone, colloidal silicon dioxide, calcium hydrogen phosphate, lactose, mannitol, syrup, gum arabic, pregelatinized starch, corn starch, powdered cellulose, hydroxypropyl cellulose, Opadry, sodium starch glycolate, lead carnauba, synthetic aluminum silicate, stearic acid, magnesium stearate, aluminum stearate, calcium stearate, sucrose, dextrose, sorbitol, talc and the like. The pharmaceutically acceptable additive according to the present disclosure is preferably included in an amount of 0.1 to 90 parts by weight based on the composition, but is not limited thereto.

The composition of the present disclosure may be administered parenterally (e.g., intravenously, subcutaneously, intraperitoneally or topically) or orally according to a desired method, and the dose may vary depending on the weight, age, sex, and health condition of a patient, a diet, an administration time, an administration method, an excretion rate, and the severity of a disease. A daily dose of the composition according to the present disclosure is 0.0001 to 10 mg/ml, preferably 0.0001 to 5 mg/ml, and more preferably administered once to several times a day.

Liquid formulations for oral administration of the composition of the present disclosure correspond to suspensions, internal solutions, emulsions, syrups, etc., and may include various excipients, such as wetting agents, sweeteners, fragrances, preservatives, and the like in addition to water and liquid paraffin, which are commonly used simple diluents. Formulations for parenteral administration include sterilized aqueous solutions, non-aqueous solvents, suspensions, emulsions, lyophilized agents, suppositories, and the like.

In one aspect, the present disclosure relates to a composition for diagnosing cancer comprising the PD-1 variant of the present disclosure.

As used herein, the term "detection" or "measurement" refers to quantifying the concentration of an object to be detected or measured.

In one aspect, the present disclosure relates to a kit for diagnosing cancer comprising the composition for diagnosing cancer of the present disclosure.

In one embodiment, the kit may further include not only tools and/or reagents for collecting a biological sample from a subject or patient, but also tools and/or reagents for preparing genomic DNA, cDNA, RNA or protein from the sample.

In the present disclosure, the term 'kit for diagnosing cancer' refers to a kit comprising the composition for diagnosing cancer of the present disclosure. Accordingly, the expression 'kit for diagnosing cancer' can be used interchangeably or in combination with the 'composition for diagnosing cancer'. As used herein, the term 'diagnosis' refers to determining the susceptibility of a subject to a specific disease or disorder, determining whether a subject currently has a specific disease or disorder, determining the prognosis of a subject suffering from a specific disease or disorder (e.g., identifying a pre-metastatic or metastatic cancer state, determining a stage of cancer, or determining the responsiveness of cancer to treatment), or therametrics (e.g., monitoring the condition of a subject to provide information about treatment efficacy).

The PD-1 variant of the present disclosure has anticancer activity through cancer cell death by immune cells by specifically binding to PD-L1, which is expressed by cancer cells to evade a killing mechanism by immune cells, with significantly increased binding ability, and specifically binds to cancer cells to be used as a theranostic agent used for the diagnosis of cancer. In addition, chimeric antigen receptor (CAR)-T cells containing the PD-1 variant instead of scFv may be produced to be used as an anticancer agent, and may also be used as an anticancer adjuvant administered simultaneously, separately or sequentially with the anticancer agent. In addition, since the PD-1 variant strongly binds to PD-L1 of cancer cells, the PD-1 variant may be used as a drug carrier targeting cancer cells.

In one aspect, the present disclosure relates to a method for providing information for cancer diagnosis comprising contacting a biological sample isolated from a subject with the PD-1 variant of the present disclosure; determining a binding level of the PD-1 variant and PD-L1; and comparing a binding level of the PD-1 variant and PD-L1 in a normal control sample.

In one embodiment, when the binding level of the PD-1 variant and PD-L1 in the biological sample isolated from the subject is higher than the binding level of the PD-1 variant and PD-L1 in the normal control sample, the method may further include determining that the test subject is cancer.

As used herein, the term "sample" refers to a biological sample obtained from a subject or patient. Sources of the biological sample may be fresh, frozen and/or preserved organ or tissue samples or solid tissue from biopsies or aspirates; blood or any blood component; and cells at any time point of conception or development in a subject.

In one aspect, the present disclosure relates to a specific detection method of PD-L1, comprising contacting a PD-1 variant with a sample and detecting the binding of the PD-1 variant to PD-L1.

In one aspect, the present disclosure relates to a method for producing a PD-1 variant having increased binding ability to PD-L1 comprising: culturing a host cell including a vector containing a nucleic acid molecule encoding the PD-1 variant of the present disclosure; and recovering the PD-1 variant expressed by the host cell.

In one aspect, the present disclosure relates to a method for producing an aglycosylated PD-1 variant having increased binding ability to PD-L1 comprising: culturing a host cell including a vector containing a nucleic acid molecule encoding the aglycosylated PD-1 variant of the present disclosure; and recovering the aglycosylated PD-1 variant expressed by the host cell.

In one aspect, the present disclosure relates to a method for producing a glycosylated PD-1 variant having increased binding ability to PD-L1 comprising: culturing a host cell including a vector containing a nucleic acid molecule encoding the glycosylated PD-1 variant of the present disclosure; and recovering the glycosylated PD-1 variant expressed by the host cell.

In one aspect, the present disclosure relates to a method for treating cancer comprising administering the PD-1 variant of the present disclosure in a pharmaceutically effective dose to a subject suffering from cancer.

In one aspect, the present disclosure relates to the use of a PD-1 variant for use in the preparation of a pharmaceutical composition for preventing and treating cancer and for use in the preparation of the pharmaceutical composition for preventing and treating cancer.

MODES OF THE INVENTION

Hereinafter, the present disclosure will be described in more detail with reference to the following Examples. However, the following Examples are only intended to embody the contents of the present disclosure, and the present disclosure is not limited thereto.

Example 1. Searching for Major Mutations of the PD-1 Variant Having Increased Binding Ability to PD-L1

In order to identify mutational sites required for improving binding ability to PD-L1 of JY 101 variants (variants with mutations substituted with S1, I13, M17, P36, I46, T69, R79, V100, P114, L139 in wild-type PD-1) exhibiting the highest binding ability to PD-L1 discovered on a display system, ten mutations thereof were substituted one by one with amino acids of wild-type PD-1 (S1L, I13F, M17L, P36S, I46M, T69C, R79G, V100G, P114L and L139A). Specifically, a genome was amplified by a QuikChange PCR technique using a primer designed for this and Pfu turbo polymerase (Agilent). The amplified gene was transformed into Jude1 and a sequence was confirmed. Thereafter, JY 101 and 10 variants thereof (S1L, I13F, M17L, P36S, I46M, T69C, R79G, V100G, P114L and L139A) were incubated in a TB medium containing 2% glucose and 40 μg/ml of chloramphenicol at 37° C. and 250 rpm for 16 hours, respectively. The incubated cells were inoculated in 6 ml of a TB medium containing 40 μg/ml of chloramphenicol at a ratio of 1:50, incubated to $OD_{600}$=0.5, cooled at 25° C. and 250 rpm for 20 minutes, and then added with 1 mM IPTG to overexpress the protein at 25° C. and 250 rpm for 5 hours. E. coli overexpressing the protein was put into an e-tube in the same amount and centrifuged at 14,000 rpm for 1 minute to recover cells. In order to remove the residual medium, the cells put in the e-tube were resuspended using 1 ml of 10 mM Tris-HCl (pH 8.0) and centrifuged at 13,500 rpm for 1 minute, and then a washing process was repeated twice. The cells were resuspended using 1 ml of an STE [0.5 M sucrose, 10 mM Tris-HCl, 10 mM EDTA (pH 8.0)] solution and rotated at 37° C. for 30 minutes to remove extracellular membrane. The cells were centrifuged at 13,500 rpm for 1 minute to collect E. coli and then a supernatant was removed. The centrifuged E. coli was resuspended in 1 ml of Solution A [0.5 M sucrose, 20 mM $MgCl_2$, 10 mM MOPS pH 6.8] and then centrifuged at 13,500 rpm for 1 minute. The centrifuged E. coli was resuspended by adding 1 ml of a solution mixed with 1 ml of Solution A and 20 μl of a 50 mg/ml lysozyme solution, and then rotated at 37° C. for 15 minutes to remove a peptidoglycan layer. After centrifugation, the supernatant was removed and the centrifuged E. coli was resuspended with 1 ml of PBS, taken to 300 μl, added with 700 μl of PBS and a 3 nM tetrameric PD-L1-Alexa488 probe, and rotated at room temperature to label spheroplasts with a fluorescent probe. After 1 hour of the labeling process, the centrifuged E. coli was centrifuged at 13,500 rpm for 1 minute, the supernatant was discarded, and the centrifuged E. coli was washed once with 1 ml of PBS and centrifuged again at 13,500 rpm for 1 minute. The centrifuged E. coli was resuspended in 1 ml of PBS, and then a change in binding ability of each variant was analyzed using Guava (Merck Millipore) equipment.

As a result, when mutations of 13I, 46I, 69T and 100V were mutated to a wild type, respectively, the binding ability was significantly reduced, and thus, it was confirmed that these four mutational sites were important for binding ability to PD-L1 (FIG. 1).

Example 2. Preparation of a Glycosylated Variant (N-IITV) and an Aglycosylated Variant (Q-IITV) with Critical Mutations of PD-L1 Binding 2-1. Preparation of N-IITV A PD-1 variant N-IITV having four binding ability-increased mutations 13I, 46I, 69T and 100V of the JY 101 variant identified in Example 1 was prepared. Specifically, a genome was amplified by Gene assembly PCR using a total of 8 primers and Vent polymerase, and then the amplified genome was treated with an SfiI enzyme. The SfiI-treated DNA was ligated into a similarly SfiI-treated pMopac12-N1pA-FLAG vector to prepare a pMopac12-N1pA-PD1_N-IITV-FLAG vector. Thereafter, the prepared vector was transformed into E. coli Jude1 to secure a single clone, and then the pMopac-12 vector insertion was identified through base sequencing to obtain a PD-1 variant N-IITV (SEQ ID NO: 2) having four major binding ability-increased mutations to PD-L1 (N-IITV of FIG. 2).

2-2. Preparation of Q-IITV

Like the N-IITV variant, in order to prepare a variant having an aglycosylation characteristic while having four binding ability-increased mutations 13I, 46I, 69T and 100V of the JY 101 variant, an aglycosylated PD-1 variant Q-IITV (F13I, N25Q, N34Q, M46I, N50Q, C69T, N92Q and G100V) (SEQ ID NO: 3) was prepared to be substituted with glutamine (Q) which had four N-glycosylation sites 25N, 34N, 50N, and 92N having the most similar structure to asparagine (N), but had aglycosylation while having four binding ability-increased mutations 13I, 46I, 69T and 100V of the JY 101 variant. To this end, the Q-IITV (F13I, N25Q, N34Q, M46I, N50Q, C69T, N92Q and G100V) genome was synthesized (Genescript), and the synthesized genome was amplified by PCR using primers and Vent polymerase, treated with an SfiI enzyme to be ligated to the SfiI-treated pMopac12-N1pA-FLAG vector to prepare a pMopac12-N1pA-PD1_Q-IITV-FLAG vector. Thereafter, the vector was transformed into E. coli Jude1 to obtain a single clone, and it was confirmed that the gene was successfully inserted into the pMopac-12 vector through sequencing (Q-IITV of FIG. 2).

Example 3. Preparation of Dimeric Human PD-L1 (PD-L1-Fc) for Screening of PD-1 Variants with High-Binding Affinity for PD-L1

3-1. PD-L1-Fc Cloning

In order to search for the binding ability to PD-L1 of the more efficiently discovered variants by increasing binding activity (avidity) and more efficiently screen aglycosylated PD-1 variants by increasing the binding activity (Avidity), an Fc domain of antibody IgG was expressed in a C-terminal portion of PD-L1 to induce dimerization and a GS linker was inserted between Fc and PD-L1 to ensure the fluidity of each protein. Specifically, PD-L1 and Fc genes were amplified using primers and Vent polymerase (New England Biolab), respectively, and then assembly PCR was performed using Vent polymerase. The prepared gene was treated with BssHII and XbaI (New England Biolab), and the restriction enzyme-treated PD-L1-Fc gene was ligated to a pMAZ vector treated with the same restriction enzyme. The ligated plasmid was transformed into Jude1 E. coli to obtain a single clone and it was confirmed that the PD-L1-Fc was successfully inserted into the pMAZ vector through base sequencing.

3-2. Expression, Purification and Labeling of PD-L1-Fc in Mammalian Cells 300 ml of Expi293F cells were subcultured at a density of $2 \times 10^6$ cells/ml, and after one day, the PD-L1-Fc expression vector prepared in Example 3-1 was transfected into Expi293F cells using PEI. The transfected cells were incubated for 7 days under conditions of 37° C., 125 rpm, and 8% $CO_2$ in a $CO_2$ shaking incubator, and then centrifuged to collect only a supernatant. Thereafter, the culture solution was equilibrated with 25×PBS and filtered through a 0.2 μm filter (Merck Millipore) using a bottle top filter. The filtered culture solution was added with 1 ml of a Protein A resin and stirred at 4° C. for 16 hours, passed through a column to recover the resin, and then washed with 10 ml of PBS. The washed resin was eluted with a 100 mM glycine pH 2.7 buffer and then neutralized using 1 M Tris-HCl pH 8.0 to obtain a purified PD-L1 dimeric protein (FIG. 3). The purified PD-L1 dimeric protein was fluorescent-labeled using an Alexa-488 labeling kit.

Example 4. Analysis of PD-L1 Binding of N-IITV Q-IITV

In order to verify the binding ability to PD-L1 of PD-1 variants JY 101, N-IITV and Q-IITV, E. coli expressing wild-type PD-1, JY 101, N-IITV and Q-IITV was incubated in a TB medium containing 2% glucose and 40 μg/ml of chloramphenicol at 37° C. and 250 rpm for 16 hours, respectively. The incubated cells were inoculated in 6 ml of a TB medium containing 40 μg/ml of chloramphenicol at a ratio of 1:100, incubated to $OD_{600}$=0.5, cooled at 25° C. and 250 rpm for 20 minutes, and then added with 1 mM IPTG to overexpress the protein at 25° C. and 250 rpm for 5 hours. *E. coli* overexpressing the protein was put into an e-tube in the same amount and centrifuged at 14,000 rpm for 1 minute to recover cells. In order to remove the residual medium, the cells put in the e-tube were resuspended using 1 ml of 10 mM Tris-HCl (pH 8.0) and centrifuged at 13,500 rpm for 1 minute, and then washed twice. The cells were resuspended using 1 ml of an STE [0.5 M sucrose, 10 mM Tris-HCl, 10 mM EDTA (pH 8.0)] solution and rotated at 37° C. for 30 minutes to remove extracellular membrane and then centrifuged at 13,500 rpm for 1 minute to collect *E. coli* and then a supernatant was removed. The centrifuged *E. coli* was resuspended in 1 ml of Solution A [0.5 M sucrose, 20 mM $MgCl_2$, 10 mM MOPS pH 6.8] and then centrifuged at 13,500 rpm for 1 minute. The centrifuged *E. coli* was resuspended by adding 1 ml of a solution mixed with 1 ml of Solution A and 20 μl of a 50 mg/ml lysozyme solution, and then rotated at 37° C. for 15 minutes to remove a peptidoglycan layer. After centrifugation, the supernatant was removed and the centrifuged *E. coli* was resuspended with 1 ml of PBS, taken to 300 μl, added with 700 μl of PBS and a 50 nM dimeric PD-L1-Fc-Alexa488 probe, and rotated at room temperature to label spheroplasts with a fluorescent probe. After 1 hour of the labeling process, the centrifuged *E. coli* was centrifuged at 13,500 rpm for 1 minute, the supernatant was discarded, and the centrifuged *E. coli* was washed once with 1 ml of PBS and centrifuged again at 13,500 rpm for 1 minute. The centrifuged *E. coli* was resuspended in 1 ml of PBS, and then binding ability to PD-L1 was analyzed using Calibur (BD Biosciences) equipment, respectively. In addition, since the expression level of PD-1 protein displayed by *E. coli* may affect the fluorescence intensity, in order to check the expression level, the centrifuged *E. coli* was resuspended with PBS and then 300 μl was taken from the remaining *E. coli*, and added with 700 μl of PBS and 0.5 μl of anti-FLAG-FITC and rotated at room temperature to label spheroplasts with a fluorescent probe. After 1 hour of the labeling process, the centrifuged *E. coli* was centrifuged at 13,500 rpm for 1 minute, the supernatant was discarded, and the centrifuged *E. coli* was washed once with 1 ml of PBS and centrifuged again at 13,500 rpm for 1 minute. The centrifuged *E. coli* was resuspended in 1 ml of PBS, and then the expression levels of PD-1 proteins were indirectly analyzed using Calibur (BD Biosciences) equipment.

As a result, although the expression levels of the N-IITV variant and the Q-IITV variant discovered in the present disclosure were lower than those of wild-type PD-1 and a JY 101 variant discovered in a previous study, it was found that the N-IITV variant and the Q-IITV variant had higher binding ability to PD-L1 than the JY 101 variant (FIG. 4). Through this, it was confirmed that N-IIITV and Q-IITV were bound to PD-L1 more strongly than JY 101, and in particular, it was confirmed that N-IITV had very strong binding ability to PD-L1 compared to Q-IITV.

Example 5. Additional Screening of Aglycosylated PD-1 Variants 5-1. Preparation of Huge PD-1 Error Prone Library for Using High-Throughput Screening In order to rapidly search for aglycosylated PD-1 variants having high binding ability to PD-L1, primers containing both SfiI sites were designed so that errors were introduced into all sites of PD-1_Q_IITV based on pMopac12-N1pA-PD-1_Q_IITV-FLAG. The genome was amplified by Error Prone PCR technique using the designed primers, Taq Polymerase (TAKARA), dNTPs (Invitrogen), $MgCl_2$, $MnCl_2$ (SIGMA), etc. The amplified genome was treated with an SfiI enzyme and inserted into an SfiI enzyme-treated pMopac12-N1pA-FLAG vector and ligated, and then transformed into Jude1 cells. The transformed *E. coli* was spread on a square plate and incubated at 37° C. for 16 hours, and then *E. coli* was recovered with TB containing 2% glucose to obtain an initial library (FIG. 5).

5-2. Screening of Aglycosylated PD-1 Variants After adding 40 μg/ml of chloramphenicol to 25 ml of a TB medium containing 2% glucose, the library prepared in Example 5-1 was inoculated into a 250 mL flask, incubated at 37° C. and 250 rpm for 4 hours, and then the incubated E. coli was inoculated at a ratio of 1:100 in 100 ml of a TB medium containing 40 μg/ml of chloramphenicol. The E. coli was incubated to $OD_{600}$=0.5, cooled at 25° C. and 250 rpm for 20 minutes, and added with 1 mM IPTG to overexpress a protein at 25° C. and 250 rpm for 5 hours, and centrifuged at 14,000 rpm for 1 minute to recover the cells. In order to remove the residual medium, the cells put in an e-tube were resuspended using 1 ml of 10 mM Tris-HCl (pH 8.0) and centrifuged at 13,500 RPM for 1 minute, and then washed twice. The cells were resuspended using 1 ml of an STE [0.5 M sucrose, 10 mM Tris-HCl, 10 mM EDTA (pH 8.0)] solution and rotated at 37° C. for 30 minutes to remove extracellular membrane. The cells were centrifuged at 13,500 rpm for 1 minute to collect E. coli and then a supernatant was removed. The centrifuged E. coli was resuspended in 1 ml of Solution A [0.5 M sucrose, 20 mM $MgCl_2$, 10 mM MOPS pH 6.8] and then centrifuged at 13,500 rpm for 1 minute. The centrifuged E. coli was resuspended by adding 1 ml of a solution mixed with 1 ml of Solution A and 20 μl of a 50 mg/ml lysozyme solution, and then rotated at 37° C. for 15 minutes to remove a peptidoglycan layer. After centrifugation, the supernatant was removed and the centrifuged E. coli was resuspended with 1 ml of PBS, taken to 300 added with 700 μl of PBS and a 25 nM dimeric PD-L1-Alexa488 probe together, and rotated at room temperature to label spheroplasts with a fluorescent probe. After 1 hour of the labeling process, the centrifuged E. coli was centrifuged at 13,500 rpm for 1 minute, the supernatant was discarded, and the obtained E. coli was washed once with 1 ml of PBS and centrifuged again at 13,500 rpm for 1 minute. The centrifuged E. coli was resuspended in 1 ml PBS, and then E. coli having high binding ability to PD-L1 was recovered using S3 sorter (Bio-Rad) equipment. The recovered E. coli genes were obtained through PCR amplification using primers, and the obtained genomes were treated with an SfiI restriction enzyme and ligated to a restriction enzyme-treated pMopac12-N1pA-FLAG vector. Each plasmid was transformed into Jude1, and then E. coli was spread on a square plate, incubated at 37° C. for 16 hours, and recovered and frozen-stored. The screening process was further repeated 4 times (rounds).

5-3. Confirmation of Amplification of Aglycosylated PD-1 Variants Having Increased PD-L1 Affinity After adding 40 μg/ml of chloramphenicol to 25 ml of TB containing 2% glucose, the initial library, round 1 library, round 2 library, round 3 library, round 4 library and round 5 library of Example 5-1 were put in a 250 mL flask, respectively. The libraries were incubated at 37° C. and 250 rpm for 4 hours, and then the incubated E. coli was inoculated at 1:100 in 100 ml of TB containing 40 μg/ml of chloramphenicol, respectively. The E. coli was incubated to $OD_{600}$=0.5, cooled at 25° C. and 250 rpm for 20 minutes, and added with 1 mM IPTG to overexpress the protein at 25° C. and 250 rpm for 5 hours. In addition, wild-type PD-1 and HAC-V-PD-1 cells were each inoculated for use as a control, and incubated at 37° C. and 250 rpm for 16 hours. The incubated cells were inoculated at 1:50 into 6 ml of a TB medium containing 40 μg/ml of chloramphenicol and incubated to $OD_{600}$=0.5 to overexpress the protein. Each E. coli was put into an e-tube in the same amount and centrifuged at 14,000 rpm for 1 minute to recover cells. In order to remove the residual medium, the cells put in the e-tube were resuspended using 1 ml of 10 mM Tris-HCl (pH 8.0) and centrifuged at 13,500 rpm for 1 minute, and then washed twice. The cells were resuspended using 1 ml of an STE [0.5 M sucrose, 10 mM Tris-HCl, 10 mM EDTA (pH 8.0)] solution and rotated at 37° C. for 30 minutes to remove extracellular membrane. The cells were centrifuged at 13,500 rpm for 1 minute to collect E. coli and then a supernatant was removed. The centrifuged E. coli was resuspended in 1 ml of Solution A [0.5 M sucrose, 20 mM $MgCl_2$, 10 mM MOPS pH 6.8] and then centrifuged at 13,500 rpm for 1 minute. The centrifuged E. coli was resuspended by adding 1 ml of a solution mixed with 1 ml of Solution A and 20 μl of a 50 mg/ml lysozyme solution, and then rotated at 37° C. for 15 minutes to remove a peptidoglycan layer. After centrifugation, the supernatant was removed and the centrifuged E. coli was resuspended with 1 ml of PBS, taken to 300 μl, added with 700 μl of PBS and a 3 nM dimeric PD-L1-Alexa488 probe together, and rotated at room temperature to label spheroplasts with a fluorescent probe. The cells were labeled for 1 hour and centrifuged at 13,500 rpm for 1 minute. The supernatant was removed and the centrifuged E. coli was washed once with 1 ml of PBS and then centrifuged again at 13,500 rpm for 1 minute. The centrifuged E. coli was resuspended in 1 ml of PBS, and then the binding ability to PD-L1 was analyzed by measuring a fluorescence signal value (mean fluorescence intensity, MFI) using a flow cytometer (Calibur, BD Biosciences).

Figure 6:
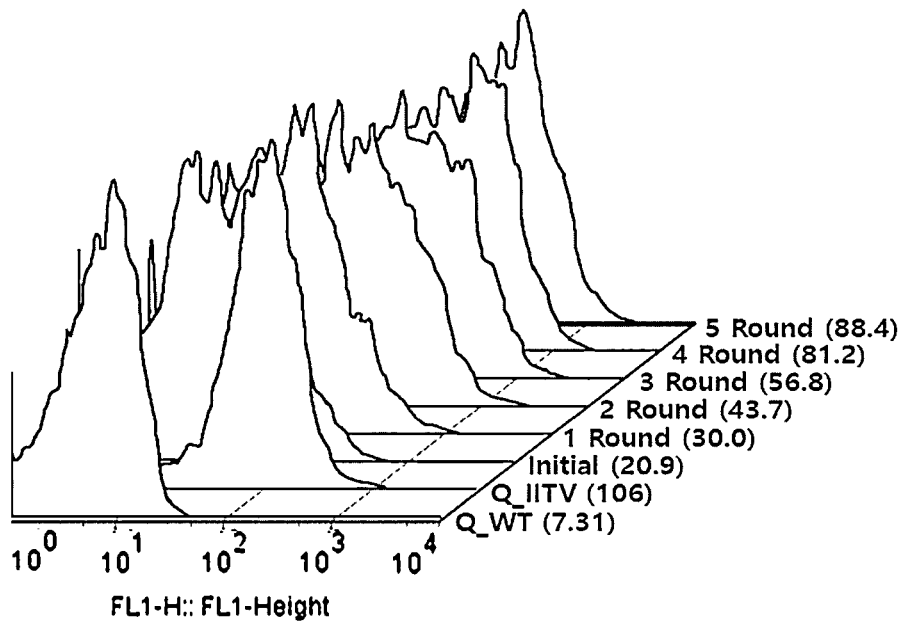

As a result, as the screening progressed, it was confirmed that the variants with high binding ability to PD-L1 were amplified in the library (FIG. 6).

Figure 7:
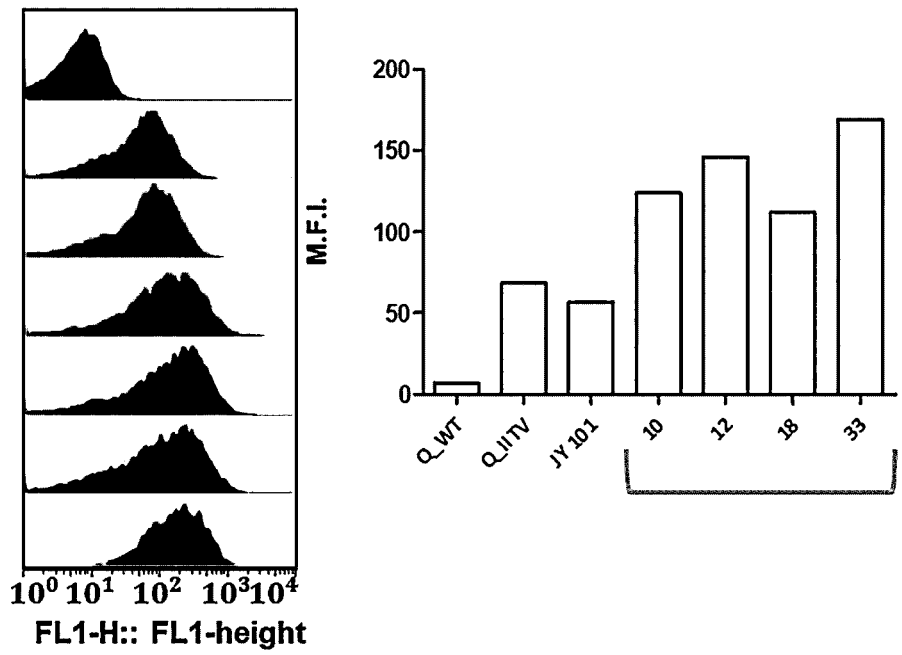

5-4. Isolation of Aglycosylated PD-1 Variants with Improved PD-L1 Binding Affinity Single colonies at the final round were incubated like Examples above to overexpress the protein and recover E. coli, respectively, and the peptidoglycan layer was removed and the spheroplasts were fluorescent-labeled, and then the binding ability to PD-L1 was analyzed by measuring the fluorescence signal values using FACSCalibur equipment. As a result, variants of Q10 (F13I, N25Q, F32L, N34Q, M46I, N50Q, T52M, C69T, V87D, N92Q, T96S, G100V, A108V) (SEQ ID NO: 4), Q12 (W8L, N9D, F13I, N25Q, N34Q, E37K, M46I, N50Q, C69T, N92Q, G100V, A108V, G140C) (SEQ ID NO: 5), Q18 (F13I, N25Q, S31G, F32L, S33P, N34Q, M46I, 547G, N50Q, T52M, C69T, N92Q, G100V, A108V, P128R, P138S) (SEQ ID NO: 6) and Q33 (F13I, N25Q, N34R, M46I, N50Q, C69T, R88G, R90Q, N92Q, G100V, A108V) (SEQ ID NO: 7) were selected due to high binding ability to PD-L1 (FIG. 7).

Example 6. Expression and Purification of Aglycosylated PD-1 Variants with Improved PD-L1 Binding Affinity After expressing and purifying top four aglycosylated PD-1 variants Q10, Q12, Q18 and Q33 in animal cells that showed high binding ability to PD-L1 in Example 5, for verifying the binding ability thereof, cloning was performed. To this end, genes of wild-type Q_PD1 in which all N-linked glycosylation sites of wild-type PD-1 were changed to Q, a control AHAC, and variants Q_IITV, Q10, Q12, Q18 and Q33 additionally discovered in the present disclosure were amplified by PCR using primers and Vent polymerase. The amplified genomes were treated with BssHII and XbaI enzymes and ligated to a pMAZ vector, a vector for expression of animal cells treated with the same enzyme, respectively. The ligated plasmid was transformed into Jude1 *E. coli*, and the sequence was confirmed through individual colony analysis. Vectors pMAZ-PD1 Q_WT-His tag, pMAZ-PD1 AHAC-His tag, pMAZ-PD1 Q_IITV-His tag, pMAZ-PD1 Q10-His tag, pMAZ-PD1 Q12-His tag, pMAZ-PD1 Q18-His tag, and pMAZ-PD1 Q33-His tag for expression of the prepared PD-1 variants were transfected into Expi293F animal cells using PEI, respectively. Thereafter, the transfected cells were incubated for 7 days under conditions of 37° C., 125 rpm, and 8% $CO_2$ in a $CO_2$ shaking incubator, and then centrifuged to collect only a supernatant. Then, the culture solution were equilibrated using 25×PBS. The culture solution were filtered with a 0.2 μm filter (Merck Millipore) using a bottle top filter, and the filtered culture solution was added with 0.5 ml of an Ni-NTA resin, stirred at 4° C. for 16 hours, and then the resin was recovered by flowing through the column. The recovered resin was washed with a PBS solution containing 10 column volume (CV) of 10 mM imidazole (Sigma) and then washed once again with 10 CV of a PBS solution containing 20 mM imidazole. Thereafter, the recovered resin was eluted with a PBS solution containing 250 mM imidazole, and then the buffer was changed using centrifugal filter units 3K (Merck Millipore). Thereafter, the expressed and purified aglycosylated PD-1 variant proteins were confirmed by SDS-PAGE gel.

Figure 8:
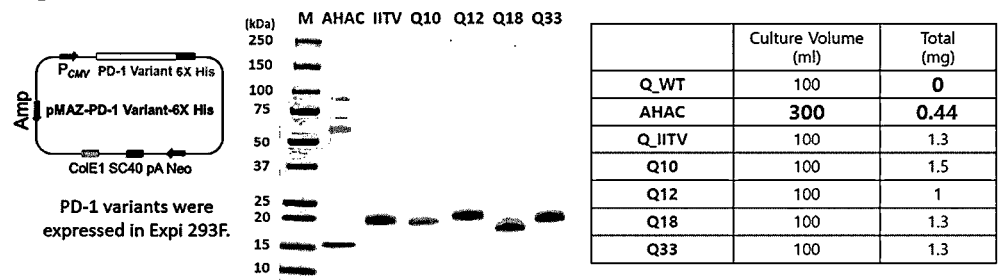

As a result, the wild-type Q_PD-1 was not expressed, and the AHAC variant as a control had very low yield, whereas the variants discovered in the present disclosure had increased stability despite the absence of glycosylation, and were obtained with high purity and yield (FIG. 8).

Example 7. Analysis of Binding Affinity for Aglycosylated PD-1 Variants

Figure 9:
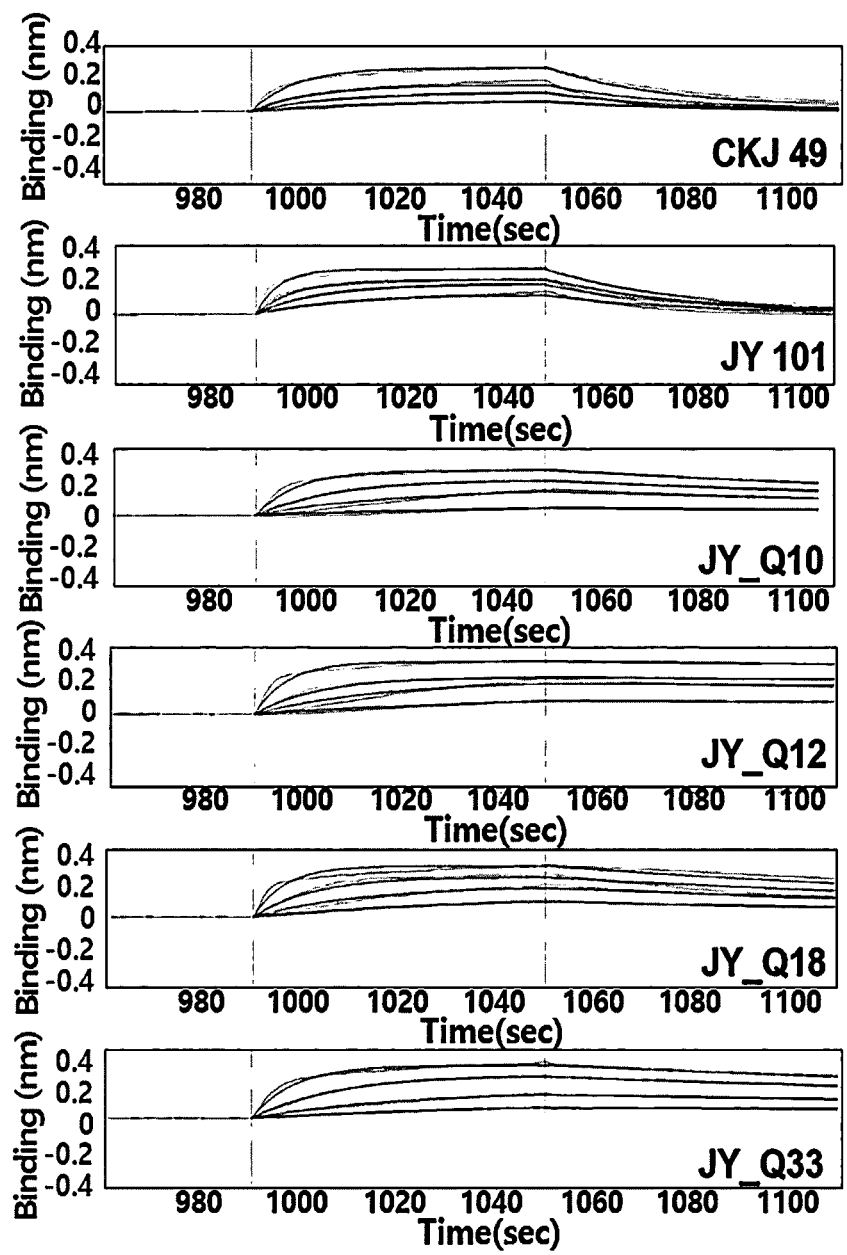

Through Biolayer interferometry assay (BLItz, Pall Fortebio), the binding ability to PD-L1 was measured in CKJ 49 (F13L/N25D/C69S/N92S/R137K), JY 101 (N1S/F13I/L17M/S36P/M46I/C69T/G79R/G100V/L114P/A139L), and aglycosylated PD-1 variants Q10, Q12, Q18 and Q33 discovered in the present disclosure. Specifically, an AR2G biosensor (Pall Fortebio) was first activated with 20 mM EDC and 10 mM s-NHS for 5 minutes, then 20 μg/ml of PD-L1-streptavidin was immobilized for 5 minutes, and then quenched for 5 minutes with 1 M ethanolamine. Thereafter, a baseline was held for 30 seconds with a 1× kinetic buffer, and then 1000 nM, 500 nM, 250 nM and 125 nM of PD-1 variants were associated for 1 minute, and then dissociated while the ix kinetic buffer flowed for 60 seconds. As a result of analyzing the final $K_D$ value after analyzing sensorgrams for each concentration of respective variants (FIG. 9), it was found that the binding ability to PD-L1 of Q12 was the highest (FIG. 10).

Example 8. Comparison of Binding Affinity to PD-L1 of Aglycosylated PD-1 Variant (JY_Q12) and Existing Glycosylated PD-1 Variant (HAC)

In the case of PD-1, since glycosylation is very important for PD-L1 binding ability and aglycosylated PD-1 almost loses PD-L1 binding ability, the binding ability to PD-L1 of the aglycosylated PD-1 variant and the glycosylated PD-1 variant discovered in the present disclosure was comparatively analyzed. To this end, through Biolayer interferometry assay (BLItz, Pall Fortebio), the binding ability to PD-L1 was measured in a glycosylated PD-1 variant HAC known in previous studies and an aglycosylated variant JY_Q12 (Q12) having the highest binding ability in Example 7. Specifically, like Examples above, an AR2G biosensor (Pall Fortebio) was first activated with 20 mM EDC and 10 mM s-NHS for 5 minutes, and 20 μg/ml of PD-L1-streptavidin was immobilized for 5 minutes, and then quenched for 5 minutes with 1 M ethanolamine. Thereafter, a baseline was held for 30 seconds with a 1× kinetic buffer, and then 1000 nM, 500 nM, 250 nM, 125 nM, and 62.5 nM of PD-1 variants were associated for 1 minute, and then dissociated while the 1× kinetic buffer flowed for 60 seconds. In this way, sensorgrams for each concentration of respective variants were analyzed (FIG. 11), and final $K_D$ values were analyzed (FIG. 12).

Figures 10, 11, 12:
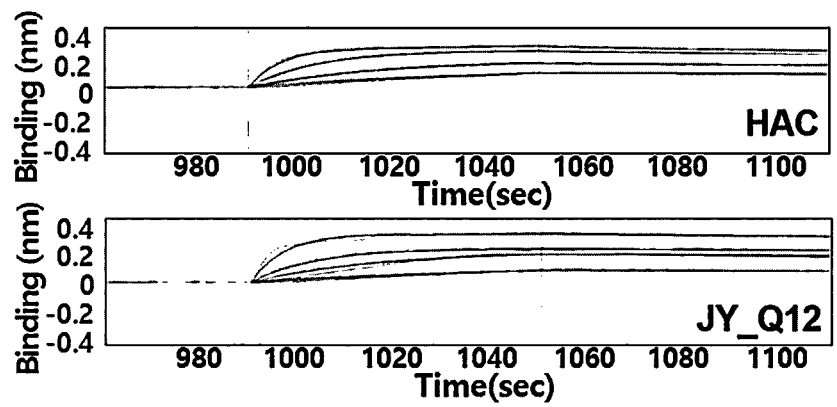

As a result, the aglycosylated PD-1 variant Q12 (JY_Q12) discovered in the present disclosure exhibited PD-L1 binding ability almost similar to that of the existing glycosylated PD-1 variant HAC (FIGS. 11 and 12). Through this, it can be confirmed that even without glycosylation important for the binding ability to PD-L1, the aglycosylated variant of the present disclosure had significantly improved binding ability to a degree similar to that of the glycosylated variant. Since the variants of the present disclosure had an aglycosylated form, it can be seen that the variants can be produced even in bacteria, there is no glycan heterogeneity problem in animal cells, and non-specific receptor binding problems due to glycosylation can be solved for various purposes such as treatment, diagnosis, and the like.

Example 9. Comparison of Binding Affinity According to Type of Amino Acid Mutation In order to confirm a difference in binding ability to PD-L1 according to a type of amino acid mutated at an amino acid mutational site of the N-IITV variant of the present disclosure, C69Y mutation of CKJ 52 variants F13I, M46I and C69Y (SEQ ID NO: 54 of the prior patent) of the prior patent (No. 10-2019-0011181) of the present inventor was replaced with Y69T to additionally prepare a CKJ 52-Y69T variant. To this end, a genome was amplified by Quikchange PCR method using the designed primers for the prepared pMopac12-N1pA-CKJ52-FLAG plasmid and Pfu turbo polymerase (Agilent), and then the amplified gene was transformed into Jude1 to confirm a sequence and additionally obtain a CKJ 52-Y69T variant. Thereafter, in order to verify the binding ability to PD-L1 of wild-type PD-1, CKJ 52 of the prior patent, the prepared CKJ 52-Y69T and the N_IITV variant of the present disclosure, *E. coli* expressing each of wild-type PD-1, CKJ 52, CKJ 52-Y69T and N-IITV was incubated in a TB medium containing 2% glucose and 40 μg/ml of chloramphenicol at 37° C. and 250 rpm for 16 hours. The incubated cells were inoculated at a ratio of 1:100 in 6 ml of a TB medium containing 40 μg/ml of chloramphenicol, incubated to $OD_{600}$=0.5, cooled at 25° C. and 250 rpm for 20 minutes, and then added with 1 mM IPTG to overexpress a protein at 25° C. and 250 rpm for 5 hours. *E. coli* overexpressing the protein was put into an e-tube in the same amount and centrifuged at 14,000 rpm for 1 minute to recover cells. In order to remove the residual medium, the cells put in the e-tube were resuspended using 1 ml of 10 mM Tris-HCl (pH 8.0) and centrifuged at 13,500 rpm for 1 minute, and then washed twice. The cells were resuspended using 1 ml of an STE [0.5 M sucrose, 10 mM Tris-HCl, 10 mM EDTA (pH 8.0)] solution and rotated at 37° C. for 30 minutes to remove extracellular membrane and then centrifuged at 13,500 rpm for 1 minute to collect *E. coli* and then a supernatant was removed. The centrifuged *E. coli* was resuspended in 1 ml of Solution A [0.5 M sucrose, 20 mM MgCl$_2$, 10 mM MOPS pH 6.8] and then centrifuged at 13,500 rpm for 1 minute. The centrifuged E. coli was resuspended by adding 1 ml of a solution mixed with 1 ml of Solution A and 20 µl of a 50 mg/ml lysozyme solution, and then rotated at 37° C. for 15 minutes to remove a peptidoglycan layer. After centrifugation, the supernatant was removed and the centrifuged E. coli was resuspended with 1 ml of PBS, taken to 300 µl, added with 700 µl of PBS and a 200 nM PD-L1-Fc-Alexa488 probe, and rotated at room temperature to label spheroplasts with a fluorescent probe. After 1 hour of the labeling process, the centrifuged E. coli was centrifuged at 13,500 rpm for 1 minute, the supernatant was discarded, and the centrifuged E. coli was washed once with 1 ml of PBS and centrifuged again at 13,500 rpm for 1 minute. The centrifuged E. coli was resuspended in 1 ml of PBS, and then the binding ability to PD-L1 was analyzed using Calibur (BD Biosciences) equipment, respectively.

As a result, CKJ 52-Y69T variants 13I, 46I and 69T in which amino acid at position 69 was substituted with T showed higher binding ability to PD-L1 than CKJ 52, and here, it was shown that the N-IITV variants 13I, 46I, 69T and 100V of the present disclosure additionally having a 100V mutation exhibited significantly high binding ability (FIG. 13).

Example 10. Preparation of Glycosylated PD-1 Variants with Improved PD-L1 Binding Affinity Since the presence or absence of glycosylation of PD-1 is important for binding to PD-L1, in order to search for a variant with more improved binding ability to PD-L1, in JY-Q12 variant (SEQ ID NO: 5) containing amino acid substitutions of W8L, N9D, F13I, N25Q, N34Q, E37K, M46I, N50Q, C69T, N92Q, G100V, A108V and G140C in an amino acid sequence (SEQ ID NO: 1) of wild-type PD-1, a total of four N-glycosylation sites or N-linked glycosylation sites existing in PD-1 ECD were glycosylated by substituting each of N25Q, N34Q, N50Q, and N92Q residues substituted with Q with N again and inducing sugar chain attachment. To this end, the genome was amplified by Quikchange PCR method using primers designed for the pMAZ-PD-1 JY-Q12 plasmid in which the gene of the JY-Q12 variant was inserted into the pMAZ vector and Pfu turbo polymerase (Agilent). The amplified genome was transformed into Jude1 E. coli and then a sequence was confirmed through individual colony analysis to prepare four types of expression vectors pMAZ-PD1 JY_Q12-1 (Q25N), pMAZ-PD1 JY_Q12-2 (Q34N), pMAZ-PD1 JY_Q12-3 (Q50N), and pMAZ-PD1 JY_Q12-4 (Q92N) including four types of glycosylated PD-1 variants JY_Q12-1 (Q25N) (SEQ ID NO: 8), JY_Q12-2 (Q34N) (SEQ ID NO: 9), JY_Q12-3 (Q50N) (SEQ ID NO: 10) and JY_Q12-4 (Q92N) (SEQ ID NO: 11), respectively (FIG. 14).

Example 11. Expression and Purification of Glycosylated PD-1 Variants

The PD-1 variant expression vectors pMAZ-PD1 JY Q12-1 (Q25N), pMAZ-PD1 JY_Q12-2 (Q34N), pMAZ-PD1 JY_Q12-3 (Q50N), and pMAZ-PD1 JY_Q12-4 (Q92N) prepared in Examples were transfected into Expi293F animal cells using PEI, respectively. Thereafter, the transfected cells were incubated for 7 days under conditions of 37° C., 125 rpm, and 8% $CO_2$ in a $CO_2$ shaking incubator, and then centrifuged to collect only a supernatant. Then, the culture solution was equilibrated using 25×PBS. The culture solution was filtered with a 0.2 µm filter (Merck Millipore) using a bottle top filter, and the filtered culture solution was added with 0.5 ml of an Ni-NTA resin, stirred at 4° C. for 16 hours, and then the resin was recovered by flowing through the column. The recovered resin was washed with a PBS solution containing 10 column volume (CV) of 10 mM imidazole (Sigma) and then washed once more with 10 CV of a PBS solution containing 20 mM imidazole. Thereafter, the recovered resin was eluted with a PBS solution containing 250 mM imidazole, and then the buffer was changed using centrifugal filter units 3K (Merck Millipore). Thereafter, the expressed and purified glycosylated PD-1 variant proteins were confirmed by SDS-PAGE gel.

Each of the four purified variants was obtained at 1 mg or more, and it was confirmed that the four purified variants had different sizes due to different glycosylation patterns (FIG. 15).

Figures 16, 17:
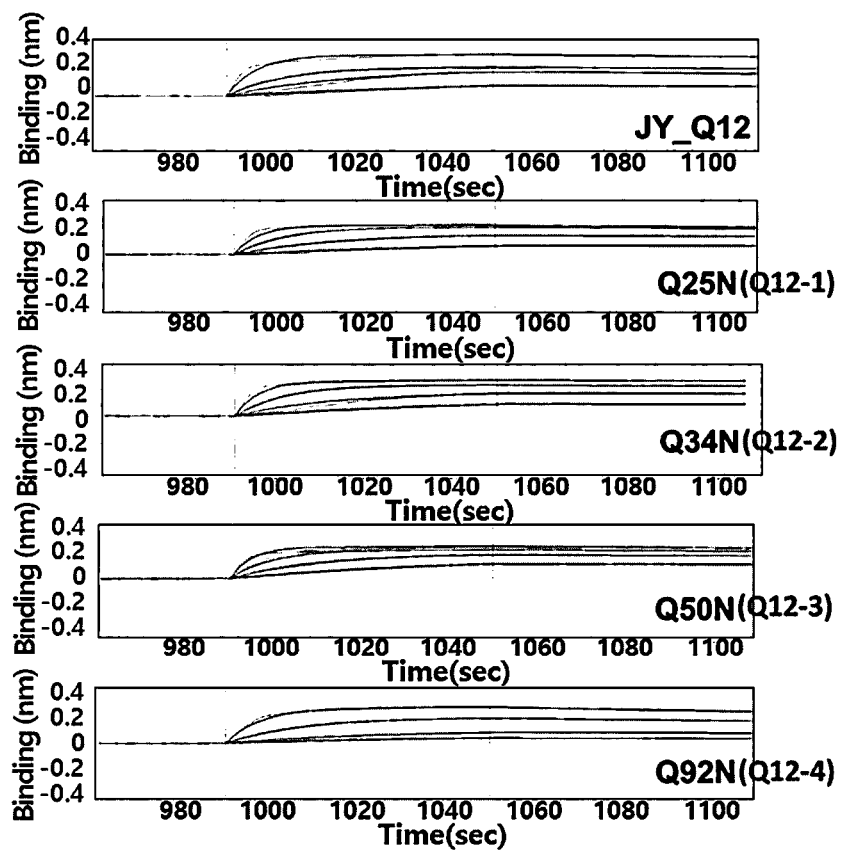

Example 12. Analysis of Binding Affinity to PD-L1 for Glycosylated PD-1 Variants Through Biolayer interferometry assay (BLItz, Pall Fortebio), for wild-type PD-1, a glycosylated PD-1 variant HAC known in previous studies (HAC-V PD-1 (N91C), Proc Natl Acad Sci USA. 2015 Nov. 24; 112(47): E6506-E6514), JY-Q12, and four glycosylated variants JY_Q12-1 (Q25N), JY_Q12-2 (Q34N), JY_Q12-3 (Q50N) and JY_Q12-4 (Q92N) of the present disclosure, the binding ability to PD-L1 was measured and compared. Specifically, an AR2G biosensor (Pall Fortebio) was first activated with 20 mM EDC and 10 mM s-NHS for 5 minutes, and 20 µg/ml of PD-L1-streptavidin was immobilized for 5 minutes, and then quenched for 5 minutes with 1 M ethanolamine. Thereafter, a baseline was held for 30 seconds with a 1× kinetic buffer, and then 100 nM to 2000 nM of PD-1 variants were associated for 1 minute, and then dissociated while the 1× kinetic buffer flowed for 60 seconds. As a result of analyzing sensorgrams for each concentration of the respective variants (FIG. 16) and analyzing the final equilibrium dissociation constant ($K_D$) value, except for JY_Q12-4 (Q92N) among the four glycosylated variants, the binding ability to PD-L1 was significantly higher than that of the existing PD-1 variants, and in particular, JY_Q12-2 (Q34N) had the highest binding ability to PD-L1 (FIG. 17).

The invention claimed is:

1. A programmed cell death protein-1 (PD-1) variant having increased binding ability to programmed death-ligand 1 (PD-L1), the PD-1 variant comprising amino acid substitutions of F13I, M46I, C69T and G100V in amino acids of wild-type PD-1 of SEQ ID NO: 1.

2. The PD-1 variant having increased binding ability to PD-L1 of claim 1, comprising an amino acid sequence of SEQ ID NO: 2.

3. The PD-1 variant having increased binding ability to PD-L1 of claim 1, further comprising any one or more amino acid substitutions of N25Q, N34Q, N50Q and N92Q.

4. The PD-1 variant having increased binding ability to PD-L1 of claim 3, wherein the variant is an aglycosylated variant.

5. The PD-1 variant having increased binding ability to PD-L1 of claim 3, comprising any one selected from the group consisting of amino acid sequences of SEQ ID NOs: 3 to 7.

6. The PD-1 variant having increased binding ability to PD-L1 of claim 1, further comprising amino acid substitutions of W8L, N9D, E37K, A108V and G140C.

7. The PD-1 variant having increased binding ability to PD-L1 of claim 6, further comprising any one or more of amino acid substitutions of N25Q, N34Q, N50Q and N92Q.

8. The PD-1 variant having increased binding ability to PD-L1 of claim 6, comprising any one selected from the group consisting of amino acid sequences of SEQ ID NOs: 8 to 11.

9. A nucleic acid molecule encoding the PD-1 variant of claim 1.

10. A vector comprising the nucleic acid molecule of claim 9.

11. A host cell comprising the vector of claim 10.

12. A binding inhibitor of PD-L1 and PD-1, the binding inhibitor comprising a programmed cell death protein-1 (PD-1) variant having increased binding ability to programmed death-ligand 1 (PD-L1), the PD-1 variant comprising amino acid substitutions of F13I, M46I, C69T and G100V in amino acids of wild-type PD-1 of SEQ ID NO: 1, a nucleic acid molecule encoding the PD-1 variant, or the vector of claim 10.

13. A composition for detecting PD-L1, the composition comprising the PD-1 variant of claim 1.

14. The composition for detecting PD-L1 of claim 13, wherein the PD-1 variant is labeled with one selected from the group consisting of a chromogenic enzyme, a radioisotope, a chromopore, a luminescent material, and a fluorescent material.

15. A pharmaceutical composition for treating or preventing cancer, the pharmaceutical composition comprising a programmed cell death protein-1 (PD-1) variant having increased binding ability to programmed death-ligand 1 (PD-L1), the PD-1 variant comprising amino acid substitutions of F13I, M46I, C69T and G100V in amino acids of wild-type PD-1 of SEQ ID NO: 1, a nucleic acid molecule encoding the PD-1 variant, or the vector of claim 10 as an active ingredient.

16. The pharmaceutical composition for treating or preventing cancer of claim 15, wherein the cancer is any one or more selected from the group consisting of brain tumor, melanoma, myeloma, non-small cell lung cancer, oral cancer, liver cancer, stomach cancer, colon cancer, breast cancer, lung cancer, bone cancer, pancreatic cancer, skin cancer, head or neck cancer, cervical cancer, ovarian cancer, colorectal cancer, small intestine cancer, rectal cancer, fallopian tube carcinoma, perianal cancer, endometrial carcinoma, vaginal carcinoma, vulvar carcinoma, Hodgkin's disease, esophageal cancer, lymph adenocarcinoma, bladder cancer, gallbladder cancer, endocrine adenocarcinoma, thyroid cancer, parathyroid cancer, adrenal cancer, soft tissue sarcoma, urethral cancer, penile cancer, prostate cancer, chronic or acute leukemia, lymphocytic lymphoma, kidney or ureter cancer, renal cell carcinoma, renal pelvic carcinoma, central nervous system tumor, primary central nervous system lymphoma, spinal cord tumor, brainstem gliomas and pituitary adenomas.

17. A composition for detecting cancer comprising the PD-1 variant of claim 1.

18. A method for providing information for cancer diagnosis, the method comprising:

a) contacting a biological sample isolated from a subject with the PD-1 variant of claim 1;

b) determining a binding level of the PD-1 variant and PD-L1; and c) comparing the binding level of the PD-1 variant and PD-L1 with a normal control sample.

19. A specific detection method of PD-L1, the specific detection method comprising:

contacting the PD-1 variant of claim 1 with a sample and detecting the binding of the PD-1 variant to PD-L1.

20. A method for producing a PD-1 variant having increased binding ability to PD-L1, the method comprising:

a) culturing a host cell including a vector containing a nucleic acid molecule encoding the PD-1 variant of claim 1; and b) recovering the PD-1 variant expressed by the host cell.

21. A method for producing an aglycosylated PD-1 variant having increased binding ability to PD-L1, the method comprising:

a) culturing a host cell including a vector containing a nucleic acid molecule encoding the PD-1 variant of claim 3; and b) recovering the PD-1 variant expressed by the host cell.

22. A method for producing glycosylated PD-1 having increased binding ability to PD-L1, the method comprising:

a) culturing a host cell including a vector containing a nucleic acid molecule encoding the PD-1 variant of claim 6; and b) recovering the PD-1 variant expressed by the host cell.

23. A method for treating cancer, the method comprising administering the PD-1 variant of claim 1 in a pharmaceutically effective dose to a subject suffering from cancer.

* * * * *

SEQUENCE LISTING

```
<160> NUMBER OF SEQ ID NOS: 11

<210> SEQ ID NO 1
<211> LENGTH: 143
<212> TYPE: PRT
<213> ORGANISM: Artificial Sequence
<220> FEATURE:
```

<223> OTHER INFORMATION: WT PD-1

<400> SEQUENCE: 1

```
Leu Asp Ser Pro Asp Arg Pro Trp Asn Pro Thr Phe Ser Pro Ala
1               5                   10                  15

Leu Leu Val Val Thr Glu Gly Asp Asn Ala Thr Phe Thr Cys Ser Phe
            20                  25                  30

Ser Asn Thr Ser Glu Ser Phe Val Leu Asn Trp Tyr Arg Met Ser Pro
            35                  40                  45

Ser Asn Gln Thr Asp Lys Leu Ala Ala Phe Pro Glu Asp Arg Ser Gln
        50                  55                  60

Pro Gly Gln Asp Cys Arg Phe Arg Val Thr Gln Leu Pro Asn Gly Arg
65                  70                  75                  80

Asp Phe His Met Ser Val Val Arg Ala Arg Arg Asn Asp Ser Gly Thr
                85                  90                  95

Tyr Leu Cys Gly Ala Ile Ser Leu Ala Pro Lys Ala Gln Ile Lys Glu
            100                 105                 110

Ser Leu Arg Ala Glu Leu Arg Val Thr Glu Arg Arg Ala Glu Val Pro
            115                 120                 125

Thr Ala His Pro Ser Pro Ser Pro Arg Pro Ala Gly Gln Phe Gln
        130                 135                 140
```

<210> SEQ ID NO 2
<211> LENGTH: 143
<212> TYPE: PRT
<213> ORGANISM: Artificial Sequence
<220> FEATURE:
<223> OTHER INFORMATION: N-IITV

<400> SEQUENCE: 2

```
Leu Asp Ser Pro Asp Arg Pro Trp Asn Pro Thr Ile Ser Pro Ala
1               5                   10                  15

Leu Leu Val Val Thr Glu Gly Asp Asn Ala Thr Phe Thr Cys Ser Phe
            20                  25                  30

Ser Asn Thr Ser Glu Ser Phe Val Leu Asn Trp Tyr Arg Ile Ser Pro
            35                  40                  45

Ser Asn Gln Thr Asp Lys Leu Ala Ala Phe Pro Glu Asp Arg Ser Gln
        50                  55                  60

Pro Gly Gln Asp Thr Arg Phe Arg Val Thr Gln Leu Pro Asn Gly Arg
65                  70                  75                  80

Asp Phe His Met Ser Val Val Arg Ala Arg Arg Asn Asp Ser Gly Thr
                85                  90                  95

Tyr Leu Cys Val Ala Ile Ser Leu Ala Pro Lys Ala Gln Ile Lys Glu
            100                 105                 110

Ser Leu Arg Ala Glu Leu Arg Val Thr Glu Arg Arg Ala Glu Val Pro
            115                 120                 125

Thr Ala His Pro Ser Pro Ser Pro Arg Pro Ala Gly Gln Phe Gln
        130                 135                 140
```

<210> SEQ ID NO 3
<211> LENGTH: 143
<212> TYPE: PRT
<213> ORGANISM: Artificial Sequence
<220> FEATURE:
<223> OTHER INFORMATION: Q_IITV

<400> SEQUENCE: 3

Leu Asp Ser Pro Asp Arg Pro Trp Asn Pro Thr Ile Ser Pro Ala

```
                1               5                  10                 15
Leu Leu Val Val Thr Glu Gly Asp Gln Ala Thr Phe Thr Cys Ser Phe
                    20                 25                 30

Ser Gln Thr Ser Glu Ser Phe Val Leu Asn Trp Tyr Arg Ile Ser Pro
                    35                 40                 45

Ser Gln Gln Thr Asp Lys Leu Ala Ala Phe Pro Glu Asp Arg Ser Gln
                    50                 55                 60

Pro Gly Gln Asp Thr Arg Phe Arg Val Thr Gln Leu Pro Asn Gly Arg
 65                 70                 75                      80

Asp Phe His Met Ser Val Val Arg Ala Arg Gln Asp Ser Gly Thr
                    85                 90                 95

Tyr Leu Cys Val Ala Ile Ser Leu Ala Pro Lys Ala Gln Ile Lys Glu
                   100                105                110

Ser Leu Arg Ala Glu Leu Arg Val Thr Glu Arg Ala Glu Val Pro
                   115                120                125

Thr Ala His Pro Ser Pro Ser Pro Arg Pro Ala Gly Gln Phe Gln
                   130                135                140
```

<210> SEQ ID NO 4
<211> LENGTH: 143
<212> TYPE: PRT
<213> ORGANISM: Artificial Sequence
<220> FEATURE:
<223> OTHER INFORMATION: JY_Q10

<400> SEQUENCE: 4

```
                1               5                  10                 15
Leu Asp Ser Pro Asp Arg Pro Trp Asn Pro Pro Thr Ile Ser Pro Ala
 1                  5                  10                 15

Leu Leu Val Val Thr Glu Gly Asp Gln Ala Thr Phe Thr Cys Ser Leu
                    20                 25                 30

Ser Gln Thr Ser Glu Ser Phe Val Leu Asn Trp Tyr Arg Ile Ser Pro
                    35                 40                 45

Ser Gln Gln Met Asp Lys Leu Ala Ala Phe Pro Glu Asp Arg Ser Gln
                    50                 55                 60

Pro Gly Gln Asp Thr Arg Phe Arg Val Thr Gln Leu Pro Asn Gly Arg
 65                 70                 75                      80

Asp Phe His Met Ser Val Asp Arg Ala Arg Arg Gln Asp Ser Gly Ser
                    85                 90                 95

Tyr Leu Cys Val Ala Ile Ser Leu Ala Pro Lys Val Gln Ile Lys Glu
                   100                105                110

Ser Leu Arg Ala Glu Leu Arg Val Thr Glu Arg Ala Glu Val Pro
                   115                120                125

Thr Ala His Pro Ser Pro Ser Pro Arg Pro Ala Gly Gln Phe Gln
                   130                135                140
```

<210> SEQ ID NO 5
<211> LENGTH: 143
<212> TYPE: PRT
<213> ORGANISM: Artificial Sequence
<220> FEATURE:
<223> OTHER INFORMATION: JY_Q12

<400> SEQUENCE: 5

```
Leu Asp Ser Pro Asp Arg Pro Leu Asp Pro Pro Thr Ile Ser Pro Ala
 1                  5                  10                 15

Leu Leu Val Val Thr Glu Gly Asp Gln Ala Thr Phe Thr Cys Ser Phe
                    20                 25                 30
```

```
Ser Gln Thr Ser Lys Ser Phe Val Leu Asn Trp Tyr Arg Ile Ser Pro
        35                  40                  45

Ser Gln Gln Thr Asp Lys Leu Ala Ala Phe Pro Glu Asp Arg Ser Gln
 50                  55                  60

Pro Gly Gln Asp Thr Arg Phe Arg Val Thr Gln Leu Pro Asn Gly Arg
 65                  70                  75                  80

Asp Phe His Met Ser Val Val Arg Ala Arg Gln Asp Ser Gly Thr
                 85                  90                  95

Tyr Leu Cys Val Ala Ile Ser Leu Ala Pro Lys Val Gln Ile Lys Glu
                100                 105                 110

Ser Leu Arg Ala Glu Leu Arg Val Thr Glu Arg Ala Glu Val Pro
            115                 120                 125

Thr Ala His Pro Ser Pro Ser Pro Arg Pro Ala Cys Gln Phe Gln
        130                 135                 140
```

<210> SEQ ID NO 6
<211> LENGTH: 143
<212> TYPE: PRT
<213> ORGANISM: Artificial Sequence
<220> FEATURE:
<223> OTHER INFORMATION: JY_Q18

<400> SEQUENCE: 6

```
Leu Asp Ser Pro Asp Arg Pro Trp Asn Pro Pro Thr Ile Ser Pro Ala
 1               5                  10                  15

Leu Leu Val Val Thr Glu Gly Asp Gln Ala Thr Phe Thr Cys Gly Leu
            20                  25                  30

Pro Gln Thr Ser Glu Ser Phe Val Leu Asn Trp Tyr Arg Ile Gly Pro
        35                  40                  45

Ser Gln Gln Met Asp Lys Leu Ala Ala Phe Pro Glu Asp Arg Ser Gln
 50                  55                  60

Pro Gly Gln Asp Thr Arg Phe Arg Val Thr Gln Leu Pro Asn Gly Arg
 65                  70                  75                  80

Asp Phe His Met Ser Val Val Arg Ala Arg Arg Gln Asp Ser Gly Thr
                 85                  90                  95

Tyr Leu Cys Val Ala Ile Ser Leu Ala Pro Lys Val Gln Ile Lys Glu
                100                 105                 110

Ser Leu Arg Ala Glu Leu Arg Val Thr Glu Arg Ala Glu Val Arg
            115                 120                 125

Thr Ala His Pro Ser Pro Ser Pro Arg Ser Ala Gly Gln Phe Gln
        130                 135                 140
```

<210> SEQ ID NO 7
<211> LENGTH: 143
<212> TYPE: PRT
<213> ORGANISM: Artificial Sequence
<220> FEATURE:
<223> OTHER INFORMATION: JY_Q33

<400> SEQUENCE: 7

```
Leu Asp Ser Pro Asp Arg Pro Trp Asn Pro Pro Thr Ile Ser Pro Ala
 1               5                  10                  15

Leu Leu Val Val Thr Glu Gly Asp Gln Ala Thr Phe Thr Cys Ser Phe
            20                  25                  30

Ser Arg Thr Ser Glu Ser Phe Val Leu Asn Trp Tyr Arg Ile Ser Pro
        35                  40                  45

Ser Gln Gln Thr Asp Lys Leu Ala Ala Phe Pro Glu Asp Arg Ser Gln
 50                  55                  60
```

```
Pro Gly Gln Asp Thr Arg Phe Arg Val Thr Gln Leu Pro Asn Gly Arg
 65                  70                  75                  80

Asp Phe His Met Ser Val Val Gly Ala Gln Arg Gln Asp Ser Gly Thr
                 85                  90                  95

Tyr Leu Cys Val Ala Ile Ser Leu Ala Pro Lys Val Gln Ile Lys Glu
            100                 105                 110

Ser Leu Arg Ala Glu Leu Arg Val Thr Glu Arg Arg Ala Glu Val Pro
        115                 120                 125

Thr Ala His Pro Ser Pro Ser Pro Arg Pro Ala Gly Gln Phe Gln
    130                 135                 140
```

```
<210> SEQ ID NO 8
<211> LENGTH: 143
<212> TYPE: PRT
<213> ORGANISM: Artificial Sequence
<220> FEATURE:
<223> OTHER INFORMATION: JY_Q12-1

<400> SEQUENCE: 8

Leu Asp Ser Pro Asp Arg Pro Leu Asp Pro Pro Thr Ile Ser Pro Ala
 1               5                  10                  15

Leu Leu Val Val Thr Glu Gly Asp Asn Ala Thr Phe Thr Cys Ser Phe
                 20                  25                  30

Ser Gln Thr Ser Lys Ser Phe Val Leu Asn Trp Tyr Arg Ile Ser Pro
             35                  40                  45

Ser Gln Gln Thr Asp Lys Leu Ala Ala Phe Pro Glu Asp Arg Ser Gln
         50                  55                  60

Pro Gly Gln Asp Thr Arg Phe Arg Val Thr Gln Leu Pro Asn Gly Arg
 65                  70                  75                  80

Asp Phe His Met Ser Val Val Arg Ala Arg Gln Asp Ser Gly Thr
                 85                  90                  95

Tyr Leu Cys Val Ala Ile Ser Leu Ala Pro Lys Val Gln Ile Lys Glu
            100                 105                 110

Ser Leu Arg Ala Glu Leu Arg Val Thr Glu Arg Arg Ala Glu Val Pro
        115                 120                 125

Thr Ala His Pro Ser Pro Ser Pro Arg Pro Ala Cys Gln Phe Gln
    130                 135                 140
```

```
<210> SEQ ID NO 9
<211> LENGTH: 143
<212> TYPE: PRT
<213> ORGANISM: Artificial Sequence
<220> FEATURE:
<223> OTHER INFORMATION: JY_Q12-2

<400> SEQUENCE: 9

Leu Asp Ser Pro Asp Arg Pro Leu Asp Pro Pro Thr Ile Ser Pro Ala
 1               5                  10                  15

Leu Leu Val Val Thr Glu Gly Asp Gln Ala Thr Phe Thr Cys Ser Phe
                 20                  25                  30

Ser Asn Thr Ser Lys Ser Phe Val Leu Asn Trp Tyr Arg Ile Ser Pro
             35                  40                  45

Ser Gln Gln Thr Asp Lys Leu Ala Ala Phe Pro Glu Asp Arg Ser Gln
         50                  55                  60

Pro Gly Gln Asp Thr Arg Phe Arg Val Thr Gln Leu Pro Asn Gly Arg
 65                  70                  75                  80

Asp Phe His Met Ser Val Val Arg Ala Arg Gln Asp Ser Gly Thr
                 85                  90                  95
```

```
                    85                  90                  95

Tyr Leu Cys Val Ala Ile Ser Leu Ala Pro Lys Val Gln Ile Lys Glu
            100                 105                 110

Ser Leu Arg Ala Glu Leu Arg Val Thr Glu Arg Arg Ala Glu Val Pro
        115                 120                 125

Thr Ala His Pro Ser Pro Ser Pro Arg Pro Ala Cys Gln Phe Gln
    130                 135                 140

<210> SEQ ID NO 10
<211> LENGTH: 143
<212> TYPE: PRT
<213> ORGANISM: Artificial Sequence
<220> FEATURE:
<223> OTHER INFORMATION: JY_Q12-3

<400> SEQUENCE: 10

Leu Asp Ser Pro Asp Arg Pro Leu Asp Pro Thr Ile Ser Pro Ala
1               5                   10                  15

Leu Leu Val Val Thr Glu Gly Asp Gln Ala Thr Phe Thr Cys Ser Phe
            20                  25                  30

Ser Gln Thr Ser Lys Ser Phe Val Leu Asn Trp Tyr Arg Ile Ser Pro
        35                  40                  45

Ser Asn Gln Thr Asp Lys Leu Ala Ala Phe Pro Glu Asp Arg Ser Gln
    50                  55                  60

Pro Gly Gln Asp Thr Arg Phe Arg Val Thr Gln Leu Pro Asn Gly Arg
65                  70                  75                  80

Asp Phe His Met Ser Val Val Arg Ala Arg Gln Asp Ser Gly Thr
                85                  90                  95

Tyr Leu Cys Val Ala Ile Ser Leu Ala Pro Lys Val Gln Ile Lys Glu
            100                 105                 110

Ser Leu Arg Ala Glu Leu Arg Val Thr Glu Arg Arg Ala Glu Val Pro
        115                 120                 125

Thr Ala His Pro Ser Pro Ser Pro Arg Pro Ala Cys Gln Phe Gln
    130                 135                 140

<210> SEQ ID NO 11
<211> LENGTH: 143
<212> TYPE: PRT
<213> ORGANISM: Artificial Sequence
<220> FEATURE:
<223> OTHER INFORMATION: JY_Q12-4

<400> SEQUENCE: 11

Leu Asp Ser Pro Asp Arg Pro Leu Asp Pro Thr Ile Ser Pro Ala
1               5                   10                  15

Leu Leu Val Val Thr Glu Gly Asp Gln Ala Thr Phe Thr Cys Ser Phe
            20                  25                  30

Ser Gln Thr Ser Lys Ser Phe Val Leu Asn Trp Tyr Arg Ile Ser Pro
        35                  40                  45

Ser Gln Gln Thr Asp Lys Leu Ala Ala Phe Pro Glu Asp Arg Ser Gln
    50                  55                  60

Pro Gly Gln Asp Thr Arg Phe Arg Val Thr Gln Leu Pro Asn Gly Arg
65                  70                  75                  80

Asp Phe His Met Ser Val Val Arg Ala Arg Asn Asp Ser Gly Thr
                85                  90                  95

Tyr Leu Cys Val Ala Ile Ser Leu Ala Pro Lys Val Gln Ile Lys Glu
            100                 105                 110
```

-continued

```
Ser Leu Arg Ala Glu Leu Arg Val Thr Glu Arg Arg Ala Glu Val Pro
        115                 120                 125

Thr Ala His Pro Ser Pro Ser Pro Arg Pro Ala Cys Gln Phe Gln
    130                 135                 140
```